(12) United States Patent
Arsalan et al.

(10) Patent No.: US 10,424,782 B2
(45) Date of Patent: Sep. 24, 2019

(54) NANOCOMPOSITE ELECTRODE MATERIALS FOR USE IN HIGH TEMPERATURE AND HIGH PRESSURE RECHARGEABLE BATTERIES

(71) Applicant: Saudi Arabian Oil Company, Dhahran (SA)

(72) Inventors: Muhammad Arsalan, Dhahran (SA); Edreese Alsharaeh, Riyadh (SA); Yasmin Mussa, Riyadh (SA); Faheem Ahmed, Riyadh (SA)

(73) Assignee: Saudi Arabian Oil Company, Dhahran (SA)

( * ) Notice: Subject to any disclaimer, the term of this patent is extended or adjusted under 35 U.S.C. 154(b) by 83 days.

(21) Appl. No.: 15/866,113

(22) Filed: Jan. 9, 2018

(65) Prior Publication Data

US 2019/0214633 A1    Jul. 11, 2019

(51) Int. Cl.
*H01M 4/36*        (2006.01)
*B01J 19/12*       (2006.01)
(Continued)

(52) U.S. Cl.
CPC ........... *H01M 4/364* (2013.01); *B01J 19/126* (2013.01); *H01M 4/483* (2013.01); *H01M 4/58* (2013.01);
(Continued)

(58) Field of Classification Search
CPC ........ H01M 4/364; H01M 4/483; H01M 4/58; H01M 4/587; H01M 10/052;
(Continued)

(56) References Cited

U.S. PATENT DOCUMENTS 8,557,916 B1    10/2013    Alsharaeh et al.
8,790,814 B2    7/2014     Wang et al.
(Continued)

FOREIGN PATENT DOCUMENTS

CN    106 398 179 A    2/2017
EP    2 578 539 A1     4/2013

OTHER PUBLICATIONS

International Search Report for PCT/IB2018/056449, 5 pages (dated Nov. 23, 2018).
(Continued)

*Primary Examiner* — Eli S Mekhlin
*Assistant Examiner* — Kourtney R S Carlson
(74) *Attorney, Agent, or Firm* — Choate, Hall & Stewart LLP; Charles E. Lyon; Cristin E. Juda

(57) ABSTRACT

Presented in the present disclosure are nanocomposites and rechargeable batteries which are resistant to thermal runaway and are safe, reliable, and stable electrode materials for rechargeable batteries operated at high temperature and high pressure. The nanocomposites include a plurality of transition metal oxide nanoparticles, a plurality of ultrathin sheets of a first two-dimensional (2D) material, and a plurality of ultrathin sheets of a different 2D material, which act in synergy to provide an improved thermal stability, an increased surface area, and enhanced electrochemical properties to the nanocomposites. For example, rechargeable batteries that include the nanocomposites as an electrode material have an enhanced performance and stability over a broad temperature range from room temperature to high temperatures. These batteries fill an important need by providing a safe and reliable power source for devices operated at high temperatures and pressures such as downhole equipment used in the oil industry.

20 Claims, 19 Drawing Sheets

(51) Int. Cl.

| | |
|---|---|
| *H01M 10/0525* | (2010.01) |
| *H01M 10/052* | (2010.01) |
| *H01M 4/58* | (2010.01) |
| *H01M 4/587* | (2010.01) |
| *H01M 4/48* | (2010.01) |
| *H01M 4/02* | (2006.01) |

(52) U.S. Cl.
CPC ......... *H01M 4/587* (2013.01); *H01M 10/052* (2013.01); *H01M 10/0525* (2013.01); *B01J 2219/0877* (2013.01); *B01J 2219/1206* (2013.01); *H01M 2004/021* (2013.01); *H01M 2004/027* (2013.01); *H01M 2004/028* (2013.01); *H01M 2300/0037* (2013.01)

(58) Field of Classification Search
CPC ....... H01M 10/0525; H01M 2004/021; H01M 2004/027; H01M 2300/0037; B01J 19/126; B01J 2219/0877; B01J 2219/1206
USPC ...................................................... 429/218.1
See application file for complete search history.

(56) References Cited

U.S. PATENT DOCUMENTS

| | | | |
|---|---|---|---|
| 9,029,228 | B2 | 5/2015 | Seacrist et al. |
| 9,203,084 | B2 | 12/2015 | Wang et al. |
| 9,362,549 | B2 | 6/2016 | Rojeski et al. |
| 9,368,831 | B2 | 6/2016 | He et al. |
| 9,705,136 | B2 | 7/2017 | Rojeski |
| 9,738,057 | B2 | 8/2017 | Shin et al. |
| 2010/0035093 | A1 | 2/2010 | Ruoff et al. |
| 2010/0218801 | A1 | 9/2010 | Sung et al. |
| 2011/0086206 | A1 | 4/2011 | Scheffer et al. |
| 2012/0142832 | A1 | 6/2012 | Varma et al. |
| 2013/0180912 | A1 | 7/2013 | Li |
| 2016/0344035 | A1 | 11/2016 | Zhamu et al. |
| 2017/0098856 | A1 | 4/2017 | Zhamu et al. |
| 2017/0141387 | A1 | 5/2017 | Hayner et al. |
| 2017/0149051 | A1 | 5/2017 | Fujita et al. |
| 2017/0294646 | A1 | 10/2017 | Zhang et al. |
| 2018/0286599 | A1* | 10/2018 | Lin ........................ H01M 4/587 |

OTHER PUBLICATIONS

International Search Report for PCT/IB2018/056450, 5 pages (dated Dec. 11, 2018).
Li, H. et al., Reduced Graphene Oxide/Boron Nitride Composite Film as a Novel Binder-Free Anode for Lithium Ion Batteries with Enhanced Performances, Electrochimica Acta, 166: 197-205 (2015).
Rao, C.N.R. et al., Graphene Analogues of Inorganic Layered Materials, Angewandte Chemie International Edition, 52(50): 13162-13185 (2013).
Written Opinion for PCT/IB2018/056449, 10 pages (dated Nov. 23, 2018).
Written Opinion PCT/IB2018/056450, 11 pages (dated Dec. 11, 2018).
Yang, Y. et al., Graphene-based materials with tailored nanostructures for energy conversion and storage, Materials Science and Engineering R, 102: 1-72 (2016).
Aldalbahi, A. et al. Variations in Crystalline Structures and Electrical Properties of Single Crystalline Boron Nitride Nanosheets, Sci. Rep., 5: (16703): 1-9 (2015).
Alsharaeh, E.H. And Othman, A.A., Microwave Irradiation Synthesis and Characterization of RGO-AgNPs/Polystyrene Nanocomposites, Polymer Composites, 1-6 (2014).
Alsharaeh, E.H. et al., Evaluation of Nanomechanical Properties of (Styrene?Methyl Methacrylate) Copolymer Composites Containing Graphene Sheets, Ind. Eng. Chem. Res., 52: 17871?17881 (2013).
Alsharaeh, E.H. et al., Microwave Irradiation Effect on the Dispersion and Thermal; Stability of RGO Nanosheets within a Polystyrene Matrix, Materials, 7: 5212-5224 (2014).
Alsharaeh, E.H. et al., Novel synthesis of holey reduced graphene oxide (HRGO) by microwave irradiation method for anode in lithium-ion batteries, 6(29854): 1-13 (2016).
Dean, C.R. et al., Boron nitride substrates for high quality graphene electronics, Nature Nanotechnology, 5: 722-726 (2010). Supplementary Information, 5 pages (2010).
Decker, R. et al., Local Electronic Properties of Graphene on a BN Substrate via Scanning Tunneling Microscopy, Nano Lett., 11: 2291-2295 (2011).
Gyenes, B. et al., Understanding Anomalous Behavior in Coulombic Efficiency Measurements on Li-Ion Batteries, Journal of the Electrochemical Society, 162(3): A278-A283 (2015).
Ishigami, M. et al., Atomic Structure of Graphene on SiO2, Nano Letters, 7(6): 1643-1648 (2007).
Kayyar, A. Construction and Testing of Coin Cells of Lithium Ion Batteries, Journal of Visualized Experiments, 66(e4104): 1-5 (2012).
Liang, Y. et al., Organic Electrode Materials for Rechargeable Lithium Batteries, Adv. Energy Mater., 2: 742-769 (2012).
Lin, D. et al., Reviving the lithium metal anode for high-energy batteries, Nature Nanotechnology, 12: 194-206 (2017).
Nakahara, K. et al., Rechargeable batteries with organic radical cathodes, Chemical Physics Letters, 359: 351-354 (2002).
Nesvadba, P. et al., Synthesis of a Novel Spirobisnitroxide Polymer and its Evaluation in an Organic Radical Battery, Chem. Mater., 22:783-788 783 (2010).
Park, M. et al., A review of conduction phenomena in Li-ion batteries, J. Power Sources, 1-26 (2010).
Suga, T. and Nishide, H., Redox-Active Radical Polymers for a Totally Organic Rechargeable Battery, Chapter 3, Polymers for Energy Storage and Delivery: Polyelectrolytes for Batteries and Fuel Cells, Page, K., et al., American Chemical Society, 9 pages (2012).
Suga, T. et al., p- and n-Type Bipolar Redox-Active Radical Polymer: Toward Totally Organic Polymer-Based Rechargeable Devices with Variable Configuration, Adv. Mater., 23:751-754 (2011).
Sun, X. et al., Developing Polymer Composite Materials: Carbon Nanotubes or Graphene?, Adv. Mater., 25: 5153-5176 (2013).
Xue, J. et al., STM Spectroscopy of ultra-flat graphene on hexagonal boron nitride, Nature Materials, 10: 282-285 (2011).
Xue, Y. et al., Excellent electrical conductivity of the exfoliated and fluorinated hexagonal boron nitride nanosheets, Nanoscale Research Letters, 8(49): 1-7 (2013).
Yan, K. et al., Ultrathin Two-Dimensional Atomic Crystals as Stable Interfacial Layer for Improvement of Lithium Metal Anode, Nano Lett., 1-7 (2014).
Zhu, J. et al., Facile synthesis of metal oxide/reduced graphene oxide hybrids with high lithium storage capacity and stable cyclability, Nanoscale, 3:1084-1089 (2011).

* cited by examiner

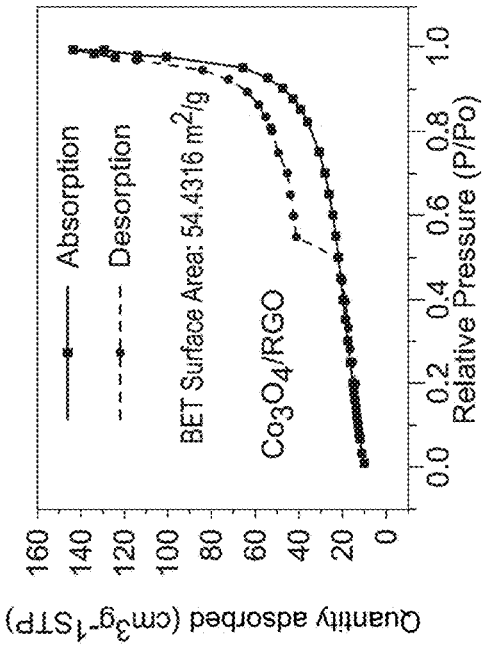
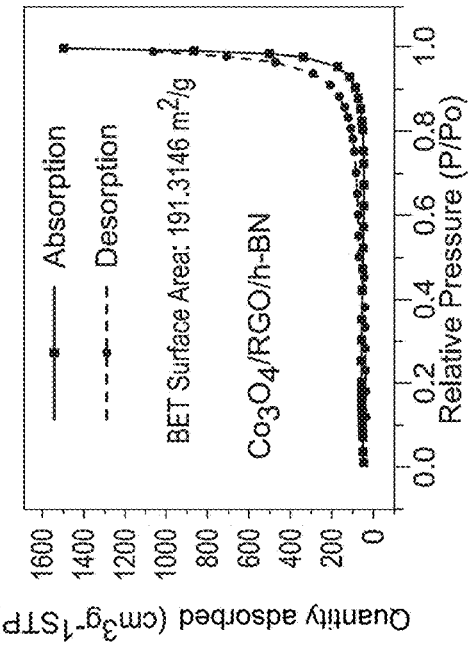
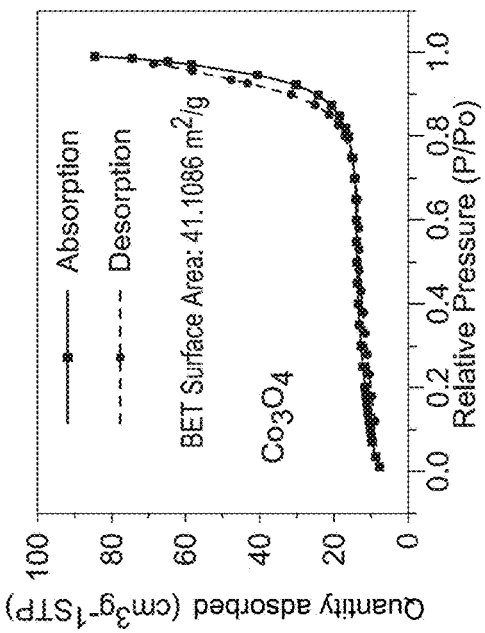
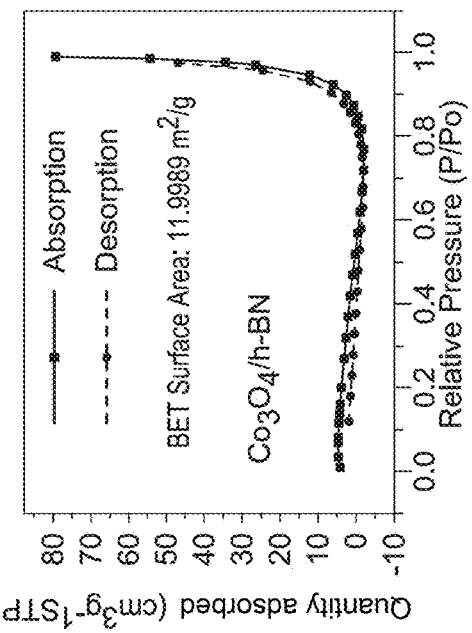
Figure 9A
Figure 9B
Figure 9C
Figure 9D

NANOCOMPOSITE ELECTRODE MATERIALS FOR USE IN HIGH TEMPERATURE AND HIGH PRESSURE RECHARGEABLE BATTERIES

FIELD

The present disclosure relates generally to nanocomposites, and more particularly to electrode materials for rechargeable batteries (for example, lithium-ion batteries, lithium-sulfur batteries, or both) designed to tolerate operation at conditions of high temperature and high pressure.

BACKGROUND

Rechargeable batteries are used to power a broad range of consumer devices such as electric vehicles and portable electronic devices. However, these batteries are susceptible to failure and can be unsafe under "abuse conditions" such as when the rechargeable batteries are overcharged, overdischarged, or operated at high temperature and high pressure. For example, when operated at a temperature that is greater than a critical temperature, a rechargeable battery can undergo thermal runaway. During thermal runaway, high temperatures trigger a chain of exothermic reactions in the battery, causing the battery's temperature to increase rapidly. Thermal runaway can cause battery failure, damage to devices, and harm to users. During thermal runaway, rechargeable batteries such as lithium-ion and lithium-sulfur batteries can be prone to fire and explosion because the electrode materials (for example, anode and cathode materials) can be highly reactive and are unstable. Even when thermal runaway does not occur, electrode materials used in rechargeable batteries can suffer from performance decay when operated at high temperatures. For example, lithium-based and silicon-based anode materials can suffer from a loss of capacity when operated at high temperatures. Accordingly, there is a need for improved electrode materials which are resistant to thermal runaway and are safe, reliable, and stable when operated at conditions of high temperature and high pressure.

SUMMARY

Presented in the present disclosure are nanocomposites and rechargeable batteries which are resistant to thermal runaway and can be used as safe, reliable, and stable electrode materials for rechargeable batteries operated at high temperature and high pressure. The nanocomposites include a plurality of transition metal oxide nanoparticles, a plurality of ultrathin sheets of a first two-dimensional (2D) material, and a plurality of ultrathin sheets of a second (and different) 2D material, which act in synergy to provide an improved thermal stability, an increased surface area, and enhanced electrochemical properties to the nanocomposites. For example, rechargeable batteries that include the nanocomposites as an electrode material have an enhanced performance and stability over a broad temperature range from room temperature to high temperatures (for example, about 100° C.). These batteries may fill an important need by providing a safe and reliable power source for devices operated at high temperatures and pressures such as the downhole equipment used in the oil industry.

The present disclosure encompasses the recognition that including a second thermally stable two-dimensional (2D) material (for example, hexagonal boron nitride) in a nanocomposite may not only improve the thermal stability of the nanocomposite but also improve the electrochemical performance of the nanocomposite when it is used as an electrode material. Thus, the nanocomposite described in the present disclosure can be used to simultaneously prevent thermal runaway events and enhance a battery's overall electrochemical performance. The 2D materials may include a 2D carbon material (for example, graphene, graphene oxide, or reduced graphene oxide), a 2D nitride (for example, hexagonal boron nitride), a 2D metal chalcogenide (for example, $MoS_2$, $SnS_2$, $TiS_2$, $WS_2$, $MoSe_2$, or $WSe_2$), a 2D oxide (for example, $TiO_2$, $ZnO$, $MnO_2$, or a perovskite), a 2D hybrid material (for example, $MoS_2$/graphene or $MoSe_2/MnO_2$), or combinations of these.

Without wishing to be bound to any particular theory, it is thought that, in certain embodiments, the second thermally stable 2D material (for example, hexagonal boron nitride) acts in synergy with the other 2D material (for example, reduced graphene oxide) and the plurality of transition metal oxide nanoparticles in the nanocomposite to enhance (i) the thermal stability, (ii) the mechanical properties (for example, strength), (iii) the physical properties (for example, the specific surface area), (iv) and the electrochemical properties (for example, the specific capacity, coulombic efficiency, and cycling performance) of the corresponding electrode material. For example, the first 2D material may be less susceptible to restacking and loss of active surface area during operation in the presence of a second (and different) 2D material over a broad temperature range and at high pressure. This results in an increased operating life and improved tolerance to high temperatures and high pressure. Moreover, without wishing to be bound to any particular theory, it is thought that the second 2D material may act as a "substrate" for the first 2D material and effectively increase its carrier mobility and thus improve its electrochemical properties as an electrode material over a broad range of temperatures and under conditions of high pressure.

In certain embodiments, the nanocomposites described in the present disclosure may perform better, be more stable, and cost less than conventional electrode materials. For example, the nanocomposites described in the present disclosure may be stable at high temperatures (of about 100° C. or greater) and may have consistent electrochemical properties even after 1,000 or more charge/discharge cycles at about 100° C. For example, the nanocomposites described in the present disclosure may not suffer from the characteristic capacity decay of silicon-based anodes after a few charge/discharge cycles at high temperature. For example, the methods described in the present disclosure are based on hydrothermal microwave irradiation and thus may be less costly than existing methods to prepare conventional electrode materials.

In certain embodiments, the rechargeable batteries (for example, lithium-ion batteries and lithium-sulfur batteries) described in the present disclosure are safer than conventional batteries when operated at high temperature. For example, dendritic lithium, which is a major cause of thermal runaway events in conventional anode materials, does not form in the nanocomposites described in the present disclosure. For example, short circuit(s) may not occur at high temperatures in the batteries described in the present disclosure, and the batteries may not undergo thermal runaway at temperatures of about 100° C. or greater. Accordingly, the nanocomposites and the rechargeable batteries described in the present disclosure can be used in safe energy-storage devices and in devices operated at high temperatures and pressure. For example, the rechargeable batteries described in the present disclosure can be used in the oil industry to power downhole equipment such as that used to monitor conditions (for example, of temperature and pressure) in oil wells and other oil-related applications where high temperatures and pressures are encountered.

In one aspect, the present disclosure is directed to a nanocomposite that includes (a) a plurality of transition metal oxide (for example, cobalt oxide) nanoparticles, (b) a plurality of ultrathin sheets of a first two-dimensional (2D) material, and (c) a plurality of ultrathin sheets of a second 2D material. The second 2D material is of a different type than the first 2D material.

In certain embodiments, the first 2D material is a member selected from the group consisting of a 2D carbon material (for example, graphene, graphene oxide, or reduced graphene oxide), a 2D nitride (for example, functionalized boron nitride or hexagonal boron nitride), a 2D metal chalcogenide (for example, $MoS_2$, $SnS_2$, $TiS_2$, $WS_2$, $MoSe_2$, or $WSe_2$), a 2D oxide (for example, $TiO_2$, ZnO, $MnO_2$, or a perovskitee), and a 2D hybrid material (for example, $MoS_2$/graphene or $MoSe_2/MnO_2$).

In certain embodiments, the second 2D material is a member selected from the group consisting of a 2D carbon material (for example, graphene, graphene oxide, or reduced graphene oxide), a 2D nitride (for example, functionalized boron nitride or hexagonal boron nitride), a 2D metal chalcogenide (for example, $MoS_2$, $SnS_2$, $TiS_2$, $WS_2$, $MoSe_2$, or $WSe_2$), a 2D oxide (for example, $TiO_2$, ZnO, $MnO_2$, or a perovskite), and a 2D hybrid material (for example, $MoS_2$/graphene or $MoSe_2/MnO_2$).

In certain embodiments, the first 2D material is graphene or reduced graphene oxide. In certain embodiments, the second 2D material is a member selected from the group consisting of hexagonal boron nitride, boron nitride, and functionalized boron nitride. For example, boron nitride may be functionalized via chemical oxidation, functionalized via hydrothermal microwave irradiation, or both.

In certain embodiments, a weight percent of the plurality of ultrathin sheets of the first 2D material is in a range from 0.1% to 20%. This weight percent is based on the total weight of the plurality of transition metal oxide nanoparticles, the plurality of ultrathin sheets of the first 2D material, and the plurality of ultrathin sheets of the second 2D material.

In certain embodiments, a weight percent of the plurality of ultrathin sheets of the second 2D material is in a range from 0.1% to 50%. This weight percent is based on the total weight of the plurality of transition metal oxide nanoparticles, the plurality of ultrathin sheets of the first 2D material, and the plurality of ultrathin sheets of the second 2D material.

In certain embodiments, the nanocomposite has a component weight ratio (x:y:z) in a range from (1:0.001:0.001) to (1:0.67:1.67), where x is the plurality of transition metal oxide nanoparticles, y is the plurality of ultrathin sheets of the first 2D material, and z is the plurality of ultrathin sheets of the second 2D material.

In certain embodiments, at least a portion of the plurality of transition metal nanoparticles has an average particle size of less than 300 nanometers (nm). For example, the size of the transition metal nanoparticles may be determined using scanning electron microscopy.

In certain embodiments, at least a portion of the plurality of transition metal nanoparticles has an average particle size in a range from 30 nm to 45 nm.

In certain embodiments, at least a portion of the plurality of transition metal nanoparticles has a particle-size distribution with a standard deviation of 2 nm.

In certain embodiments, at least a portion of the plurality of transition metal nanoparticles has an approximately rectangular prism shape. For example, the shape of the transition metal nanoparticles may be determined using scanning electron microscopy.

In certain embodiments, at least a portion of the plurality of transition metal oxide nanoparticles comprise cobalt oxide (for example, $Co_3O_4$).

In certain embodiments, at least a portion of the cobalt oxide has a cubic-spinel crystal structure. For example, the crystal structure may be determined based on an intensity or a relative intensity of a peak in an X-ray diffraction (XRD) pattern of the plurality of transition metal oxide nanoparticles. For example, the crystal structure may be determined based on an interplanar spacing measured with Selected Area Electron Diffraction (SAED) analysis.

In certain embodiments, at least a portion of the plurality of ultrathin sheets of the first 2D material and at least a portion of the plurality of ultrathin sheets of the second 2D material has an average sheet thickness of less than 20 nm. For example, the thickness of the ultrathin sheets may be determined using scanning electron microscopy.

In certain embodiments, at least a portion of the plurality of ultrathin sheets of the first 2D material and at least a portion of the plurality of ultrathin sheets of the second 2D material have an average sheet thickness in a range from 5 nm to 20 nm.

In certain embodiments, at least a portion of the plurality of ultrathin sheets of the first 2D material and at least a portion of the plurality of ultrathin sheets of the second 2D material have an average sheet thickness in a range from 5 nm to 10 nm.

In certain embodiments, the nanocomposite has a specific surface area in a range from 10 square meters per gram ($m^2$/g) to 500 $m^2$/g. For example, the specific surface area may be a Brunauer-Emmett-Teller (BET) specific surface area measured via a nitrogen adsorption/desorption isotherm. In certain embodiments, the nanocomposite has a specific surface area in a range from 10 $m^2$/g to 200 $m^2$/g.

In certain embodiments, the nanocomposite further comprises (i) a binding agent (for example, polyvinylidene fluoride), (ii) a conductive additive (for example, carbon black), or both of (i) and (ii).

In certain embodiments, a summed weight percent of the binding agent and the conductive additive in the nanocomposite is in a range from 5% to 20%. For example, the summed weight percent of the binding agent and the conductive additive may be about 10%. The summed weight percent is based on the total weight of (i) the plurality of transition metal oxide nanoparticles, (ii) the plurality of ultrathin sheets of the first 2D material, (iii) the plurality of ultrathin sheets of the second 2D material, and (iv) any binding agent, conductive additive, or both present in the nanocomposite. For example, the amount of the binding agent in the nanocomposite may be zero; the amount of conductive additive in the nanocomposite may be zero; or the nanocomposite may contain both the binding agent and the conductive additive.

In certain embodiments, the nanocomposite is a film with a thickness in a range from 50 micrometers (μm) to 200 μm. For example, film thickness may be measured using profilometry or scanning electron microscopy.

In certain embodiments, the nanocomposite is a film with a thickness in a range from 10 μm to 20 μm.

In certain embodiments, the nanocomposite also includes sulfur. For example, the nanocomposite also includes elemental sulfur, a sulfur-containing salt, a sulfur-containing and lithium-containing salt, a sulfur/graphene composite, or combinations of these.

In certain embodiments, the weight percent of sulfur is in a range from 40% to 80%. For example, the weight percent of sulfur may be from 60% to 80% or from 70% to 80%. The weight percent is based on the total weight of (i) the plurality of transition metal oxide nanoparticles, (ii) the plurality of ultrathin sheets of the first 2D material, (iii) the plurality of ultrathin sheets of the second 2D material, (iv) any binding agent, conductive additive, or both present in the nanocomposite, and (v) the sulfur.

In one aspect, the present disclosure is directed to a lithium-ion battery that includes an anode. The anode includes the nanocomposite described previously.

In certain embodiments, the lithium-ion battery also includes a cathode (for example, lithium metal or a lithium metal oxide); an electrolyte [for example, one or more lithium salts (for example, lithium hexafluorphosphate) dissolved in one or more organic solvents (for example, ethylene carbonate or dimethyl carbonate)]; and a separator (for example, a polypropylene membrane) between the anode and the cathode.

In certain embodiments, at about 25° C., the lithium-ion battery has a specific capacity (for example, specific charge/discharge capacity) in a range from 600 milliamp-hours per gram (mAh/g) (for example, 651.4 mAh/g) to at least 800 mAh/g (for example, 816.5 mAh/g). For example, the specific capacity may be measured at a current density of about 200 milliamps per gram (mA/g)). At about 100° C., the lithium-ion battery has a specific capacity (for example, charge/discharge capacity) in a range from 1 to 5 mAh/g (for example, a specific charge capacity of 1 mAh/g and a specific discharge capacity of 2 mAh/g. For example, the specific capacity may be measured at a current density of about 100 mA/g. In certain embodiments, after 100 charge/discharge cycles at about 100° C. or after 1000 charge/discharge cycles at about 100° C., the lithium-ion battery retains at least 90% of its specific capacity compared to an initial specific charge capacity in a first charge cycle at about 100° C.

In certain embodiments, after 100 charge/discharge cycles at about 100° C. or after 1000 charge/discharge cycles at about 100° C., a coulombic efficiency of the lithium-ion battery is 90% or greater at 100° C.

In one aspect, the present disclosure is directed to a lithium-sulfur battery that includes a cathode. The cathode includes the nanocomposite described previously.

In certain embodiments, the lithium-sulfur batter also includes an anode (for example, lithium metal); an electrolyte [for example, one or more lithium salts (for example, bis(trifluoromethane)sulfonimide lithium salt (LiTFSI)) in an organic solvent (for example, 1,2-dimethoxyethane (DME) or 1,3-dioxolane (DOL))]; and a separator (for example, a polypropylene membrane) between the anode and the cathode.

In one aspect, the present disclosure is directed to a method of preparing a nanocomposite. The method includes preparing a plurality of transition metal oxide nanoparticles and a plurality of ultrathin reduced graphene oxide sheets by applying microwave irradiation to a volume of a first solvent comprising a transition metal-containing salt [for example, cobalt (II) acetate tetrahydrate ($Co(C_2H_3O_2)_2$), cobalt nitrate, or cobalt chloride] and graphene oxide. For example, microwave irradiation may be applied at a temperature of at least 140° C. Microwave irradiation may be applied at a temperature in a range from 140° C. to 220° C. Microwave irradiation may, for example, be applied at 180° C. Microwave irradiation may be applied at, for example, a microwave power of at least 900 watts (W). Microwave irradiation may be applied at a microwave power in range from 900 W to 1800 W. Microwave irradiation may be applied at a pressure of at least 150 pounds per square inch (psi) or, for example, at a pressure in a range from 150 psi to 350 psi. The concentration of the transition metal-containing salt is in a range from 0.01 moles per liter (mol/L) to 0.5 mol/L. The method includes preparing a plurality of ultrathin boron nitride sheets by (i) oxidizing boron nitride in a volume of a second solvent (for example, a mixture of $H_2O_2$ and $H_2SO_4$) and (ii) applying microwave irradiation to the volume of the second solvent (for example, for 15 minutes at a temperature in a range from 120° C. to 180° C., at a microwave power of 900 W, and at a pressure of 150 psi). The method includes contacting together (i) at least a portion of the plurality of transition metal oxide nanoparticles, (ii) at least a portion of the plurality of ultrathin reduced graphene oxide sheets, and (iii) at least a portion of the plurality of ultrathin boron nitride sheets in a volume of a third solvent, thereby preparing a nanocomposite mixture. The method includes drying the nanocomposite mixture (for example, for about 12 hours at 60° C.), thereby preparing a nanocomposite.

In certain embodiments, the method includes, following drying the nanocomposite mixture, contacting together the nanocomposite mixture with sulfur (for example, elemental sulfur, a sulfur-containing salt, a sulfur-containing and lithium-containing salt, a sulfur/graphene composite, or combinations of these). For example, the weight percent of sulfur may be in a range from 50% to 80%, from 60% to 80%, or from 70% to 80%. The weight percent is based on the total weight of the nanocomposite.

BRIEF DESCRIPTION OF THE DRAWING

The foregoing and other objects, aspects, features, and advantages of the present disclosure will become more apparent and better understood by referring to the following description taken in conjunction with the accompanying drawings, in which:

FIG. 9A is a plot of the nitrogen adsorption-desorption isotherm for example $Co_3O_4$ nanoparticles, according to an illustrative embodiment;

FIG. 9B is a plot of the nitrogen adsorption-desorption isotherm for an example $Co_3O_4$/RGO sample, according to an illustrative embodiment;

FIG. 9C is a plot of the nitrogen adsorption-desorption isotherm for an example $Co_3O_4$/h-BN sample, according to an illustrative embodiment;

FIG. 9D is a plot of the nitrogen adsorption-desorption isotherm for an example $Co_3O_4$/RGO/h-BN nanocomposite, according to an illustrative embodiment;

Figure 1A:
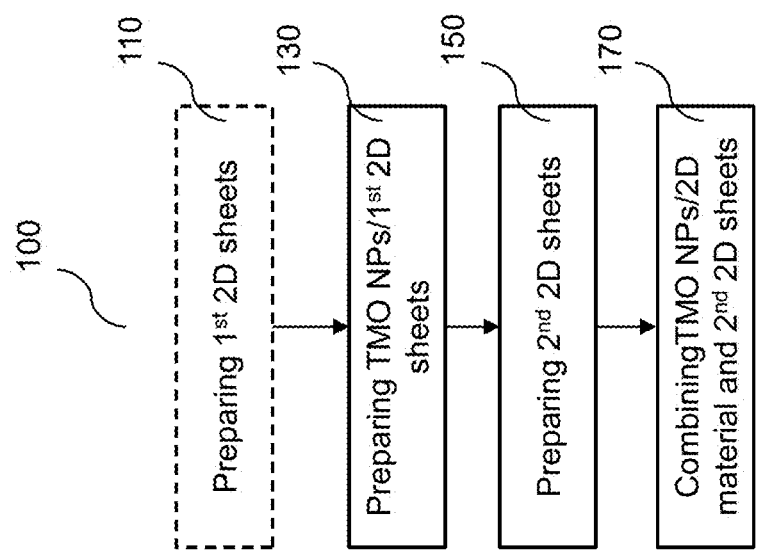
FIG. 1A is a block diagram showing a method for preparing a nanocomposite, according to an illustrative embodiment.

The features and advantages of the present disclosure will become more apparent from the detailed description set forth in the following when taken in conjunction with the drawings, in which like reference characters identify corresponding elements throughout. In the drawings, like reference numbers generally indicate identical elements, functionally similar elements, or structurally similar elements.

Definitions

About, Approximately: As used in the present disclosure, the terms "about" and "approximately," in reference to a number, are used to include numbers that fall within a range of 20%, 10%, 5%, 1%, or 0.5% in either direction of (greater than or less than) the number unless otherwise stated or otherwise evident from the context (except where such number would exceed 100% of a possible value).

Anode: As used in the present disclosure, the term "anode" refers to the negative electrode of a battery. Oxidation reactions occurs at the anode.

Carrier Mobility: As used in the present disclosure, the term "carrier mobility" refers to a metric of how quickly an electron or hole can be transported through a material in the presence of an electric field. For example, an electrode with an increased carrier mobility tends to have an increased conductivity and improved electrochemical properties compared to an electrode with a decreased carrier mobility.

Cathode: As used in the present disclosure, the term "cathode" refers to the positive electrode of a battery. Reduction reactions occur at the cathode.

Capacity, specific capacity, specific charge capacity: As used in the present disclosure, the term "capacity" means the product of the discharge current (for example, in amps (A) or milliamps (mA)) and the discharge time (for example, in hours (h)) for a battery at a given load. For example, a "capacity" may be expressed in amp-hours (Ah) or milliamp-hours (mAh). As used in the present disclosure, the term "specific capacity" means the product of the discharge current and the discharge time of a battery at a given load for a given weight of electrode material (for example, for a given weight of nanocomposite used as an anode material in a battery). For example, a "specific capacity" may be expressed in amp-hours per gram (Ah/g) or milliamp-hours per gram (mAh/g). In certain embodiments, "specific capacity" is referred to as "specific discharge capacity." As used in the present disclosure, the term "specific charge capacity" means the product of the charge current and the charge time for a battery at a given load for a given weight of electrode material (for example, for a given weight of nanocomposite used as an anode material). For example, a "specific charge capacity" may be expressed in Ah/g or mAh/g.

Charge/discharge cycle, Cycle: As used in the present disclosure, the terms "charge/discharge cycle" and "cycle" refer to the process of charging, discharging, or both a battery. For example, a single "charge/discharge cycle" includes charging and discharging a battery. In certain embodiments, a battery may be discharged either fully or partially during a discharge cycle. For example, 100%, 90%, 80%, 70%, or less of a battery's capacity may be discharged during a discharge cycle. Similarly, in certain embodiments, a battery may be charged either fully or partially during a charge cycle. For example, a battery may be charged to 100%, 90%, 80%, 70%, or less of its full capacity during a charge cycle.

Downhole equipment: As used in the present disclosure, the term "downhole equipment" refers to devices used to measure the conditions inside an oil well. For example, downhole equipment may include a pressure sensor for measuring the pressure inside an oil well or a temperature sensor for measuring the temperature inside an oil well. As used in the present disclosure, the term "oil well" means a boring (for example, a drilled hole or tunnel) in the earth that is designed to bring hydrocarbons (for example, oil) from an underground hydrocarbon reservoir to the surface.

Graphene oxide: As used in the present disclosure, the term "graphene oxide" refers to a material substantially composed of ultrathin sheets of a compound of carbon, oxygen, and hydrogen, where each sheet has a thickness defined by a monolayer of carbon rings (for example, a layer of carbon rings approximately one atom thick, with attached oxygen-containing moieties on the edges of the carbon rings, above the plane of carbon rings, below the plane of carbon rings, or combinations of these). In certain embodiments, the carbon, oxygen, and hydrogen may be present in variable ratios. Graphene oxide may be obtained, for example, by treating graphite with strong oxidizers. In certain embodiments, the graphene oxide may include a dopant; in certain embodiments there is no dopant. Examples of dopants include boron and nitrogen.

High Pressure: As used in the present disclosure, the term "high pressure" refers to a pressure of greater than atmospheric pressure (1 atmosphere). For example, an oil well is typically under conditions of high pressure during oil recovery because of the high temperature of the well, hydrostatic pressure from the column of water extending from the well bore to the oil-bearing formation, pressure induced by pumping fluid in and out of the reservoir, and internal sources of pressure such as from the gases and fluids in the reservoir. Examples of high pressure are, for example, at least 1 atmosphere, at least 10 pounds per square inch gauge (psig), at least 50 psig, at least 100 psig, at least 200 psig, at least 500 psig, at least 1000 psig, at least 2000 psig, at least 3000 psig, or at least 5000 psig.

High Temperature: As used in the present disclosure, the term "high temperature" refers to a temperature from about 80° C. to about 100° C. For example, an oil reservoir, during drilling or oil recovery, may have a temperature of 80° C. to 100° C. or greater.

Improve, Increase, Reduce, Decrease: As used in the present disclosure, the terms "improve", "increase", "reduce, "decrease", or their grammatical equivalents, indicate values that are relative to a baseline or other reference measurement. In certain embodiments, an appropriate reference measurement may be or comprise a measurement under particular reference conditions (for example, at a temperature near an average ambient temperature) absent the presence of (for example, prior to) a particular change in these conditions (for example, a change in temperature).

Stable: As used in the present disclosure, the term "stable" refers to not substantially changing in physical properties or not substantially deteriorating in performance over a usable lifetime. For example, a stable nanocomposite does not undergo substantial physical changes during a predetermined useable lifetime of the product in which the nanocomposite is used. For example, a stable electrode for a rechargeable battery substantially retains its charge capacity after repeated use.

Substantially: As used in the present disclosure, the term "substantially" refers to the qualitative condition of exhibiting total or near-total extent or degree of a characteristic or property, where "near-total" means within 20%, 10%, 5%, 1%, or 0.5% of the total (in either direction).

Two-dimensional (2D) material: As used in the present disclosure, the term "2D material" refers to a material substantially composed of ultrathin sheets having a thickness defined by a monolayer approximately one atom thick. For example, graphene, reduced graphene oxide, hexagonal boron nitride, and the like are two-dimensional materials. In certain embodiments, the 2D material may include a dopant; in certain embodiments there is no dopant. Examples of dopants include carbon, boron, and nitrogen, Thermal Stability: As used in the present disclosure, the term "thermal stability" refers to a measure of the extent to which a material is stable at high temperature. For example, an electrode material with a superior thermal stability will remain stable at high temperature, while an electrode material with an inferior thermal stability will likely undergo changes (for example, chemical or structural transformations) leading to decreased performance.

Ultrathin: As used in the present disclosure, the term "ultrathin" refers to having a thickness defined by a monolayer within one or two orders of magnitude of the thickness of a single atom. For example, a plurality of ultrathin sheet may have an average sheet thickness no greater than 20 nm, for example, in a range from 5 nm to 20 nm. In other embodiments, an ultrathin sheet may have an average thickness equal to the diameter of no greater than 10 atoms, no greater than 5 atoms, no greater than 3 atoms, no greater than 2 atoms, or about 1 atom. For example, an ultrathin sheet may have a thickness from about 0.3 nm to 1.5 nm.

DETAILED DESCRIPTION

It is contemplated that systems, architectures, devices, methods, and processes described in the present disclosure encompass variations and adaptations developed using information from the embodiments described in the present disclosure. Adaptation, modification, or both of the systems, architectures, devices, methods, and processes described in the present disclosure may be performed, as contemplated by this description.

Throughout the description, where articles, devices, systems, and architectures are described as having, including, or comprising specific components, or where processes and methods are described as having, including, or comprising specific steps, it is contemplated that, additionally, there are articles, devices, systems, and architectures of the present disclosure that consist essentially of, or consist of, the recited components, and that there are processes and methods according to the present disclosure that consist essentially of, or consist of, the recited processing steps.

It should be understood that the order of steps or order for performing certain action is immaterial so long as the disclosure remains operable. Moreover, two or more steps or actions may be conducted simultaneously.

The mention in the present disclosure of any publication, for example, in the Background section, is not an admission that the publication serves as prior art with respect to any of the claims presented in the present disclosure. The Background section is presented for purposes of clarity and is not meant as a description of prior art with respect to any claim.

Headers are provided for the convenience of the reader—the presence, placement, or both of a header is not intended to limit the scope of the subject matter described in the present disclosure.

The present disclosure encompasses a recognition of the synergistic effects of combining two different two-dimensional (2D) materials with a plurality of transition metal oxide nanoparticles. For example, a nanocomposite that includes a plurality of hexagonal boron nitride sheets, a plurality of reduced graphene oxide sheets, and a plurality of $Co_3O_4$ nanoparticles may provide improved thermal properties and improved electrochemical properties when used as an electrode material in a rechargeable battery. For example, a nanocomposite in which the weight percent of the plurality of ultrathin reduced graphene oxide sheets is in a range from 0.1% to 20% and the weight percent of the plurality of ultrathin boron nitride sheets is in a range from 0.1% to 50% may exhibit an enhanced specific surface area, an improved specific charge/discharge capacity, and a stable cycling performance at both room temperature (for example, about 25° C.) and at high temperatures (for example, at about 100° C. or greater).

In certain embodiments, the batteries (for example, lithium-ion batteries or lithium-sulfur batteries) described in the present disclosure can be used to power downhole equipment which is used to measure conditions inside oil wells or during other oil operations, for example during oil discovery and recovery. For example, downhole equipment includes pressure and temperature sensors for measuring the pressure and temperature, respectively, in an oil well during drilling and oil recovery. For example, conditions in an oil well can be variable with temperatures in a range from 80° C. to 100° C. or greater. The ability to monitor these conditions allows drilling and oil recovery to be performed more effectively and for potential safety concerns (for example, caused by sudden increases in temperature, pressure, or both) to be identified early such that the risks of damage to equipment and human injury are greatly reduced. The rechargeable batteries described in the present disclosure may have improved safety, electrochemical properties, and stability compared to those of conventional batteries used to power downhole equipment. For example, the lithium-ion batteries and lithium-sulfur batteries described in the present disclosure provide lightweight power sources with an improved energy density, cycle life, and structural stability than batteries employing conventional electrode materials.

In certain embodiment, the rechargeable batteries described in the present disclosure obviate (or decrease) the need for complex engineering techniques and safety devices that may otherwise be used in an attempt to limit the likelihood of thermal runaway. For example, while safety devices may relieve high pressure in a battery to help prevent thermal runaway, such devices are not 100% effective or completely reliable. Instead, the rechargeable batteries described in the present disclosure provide a more cost-effective and safer option for preventing thermal runaway without relying on complex safety devices.

Nanocomposites

Preparing Precursor(s) to 2D Material(s)

FIG. 1A shows an illustrative example of a method 100 for preparing a nanocomposite, according to an illustrative embodiment. In certain embodiments, the method, optionally, begins with preparing a precursor to the first 2D material in Step 110. As an illustrative example of this step, FIG. 1B shows an example method 102 for preparing graphene oxide from graphite.

Figure 1B:
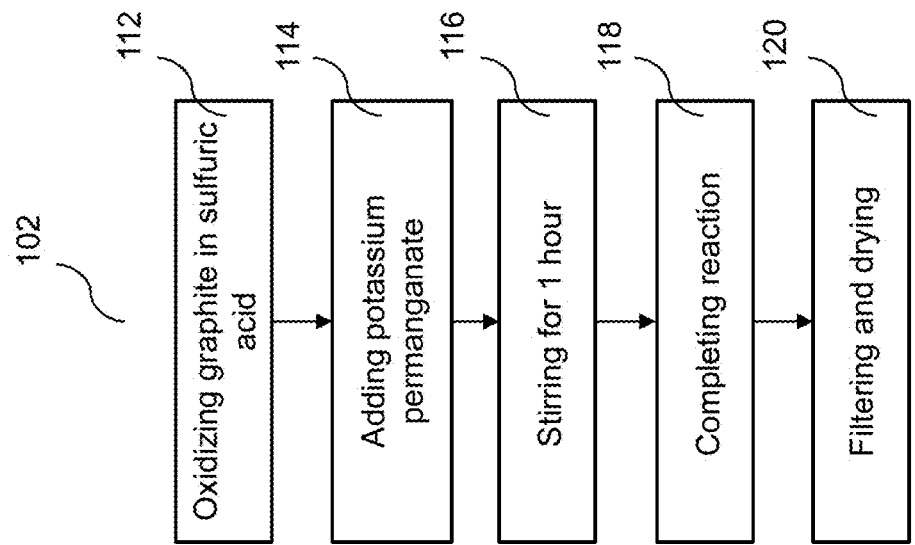
FIG. 1B is a block diagram showing a method for preparing graphene oxide, according to an illustrative embodiment.

As shown in the illustrative example of FIG. 1B, graphite is oxidized in sulfuric acid (Step 112). The concentration of the graphite is about 5 milligrams per milliliter (mg/mL) or more. For example, the concentration of the added graphite may be in a range from about 5 mg/mL to about 20 mg/mL. The concentration of sulfuric acid is at least 1 mole per liter (mol/L). For example, the concentration of sulfuric acid may be in a range from 1 mol/L to 3 mol/L.

In Step 114, potassium permanganate is added to the mixture that was prepared in Step 112. Potassium permanganate is added to achieve a final concentration of potassium permanganate of at least 1 mol/L. For example, the concentration of the potassium permanganate may be in a range from 1 mol/L to 2 mol/L. In Step 114, potassium permanganate is added to the mixture prepared in Step 112 at a volume ratio of 1:1 (volume potassium permanganate solution:volume of sulfuric acid solution). In certain embodiments, the mixture prepared in Step 112 may be cooled to 20° C. or less prior to the addition of potassium permanganate.

In Step 116, the mixture prepared in Step 114 is stirred or mixed. For example, the mixture may be stirred for 5 minutes (min), 10 min, 30 min, 1 hour, 12 hours, or a similar time interval. For example, the mixture may be stirred mechanically, agitated with a magnetic stir bar, or exposed to ultrasonic irradiation. The method of stirring may be selected to correspond to the size of vessel used to prepare the mixture in Step 112 and Step 114. Mixing or stirring in Step 116 may be performed at a temperature in a range from about 30° C. to 40° C.

Following Step 116, the reaction was completed in Step 118. For example, solids in the mixture are separated from the liquids (for example, via centrifugation and removal of the supernatant). The solids are then redispersed in a reaction fluid to complete the oxidation reaction. In certain embodiments, the reaction fluid may include hydrogen peroxide ($H_2O_2$). The concentration of hydrogen peroxide in the reaction fluid is at least 0.1 mol/L. For example, the concentration of hydrogen peroxide may be in a range from 0.1 mol/L to 0.3 mol/L. In certain embodiments, the reaction fluid can include sodium percarbonate. Graphene oxide is produced after Step 118.

After the reaction is completed in Step 118, the solid product is separated from the reaction fluid and dried to obtain a graphene oxide powder in Step 120. The material may be filtered using centrifugation, filter paper, vacuum filtration, or combinations of these. For example, the material may be dried at room temperature or at 50° C., 60° C., 70° C., or 80° C. to obtain a dry powder of graphene oxide. For example, the product may be dried for 1 hour, 2 hours, 6 hours, 12 hours, 24 hours, or similar intervals of time.

In certain embodiments, the preparation of graphene oxide may not be required. For example, graphene oxide may be purchased (for example, as a dry powder or dispersed in a fluid) and used as-received. In certain embodiments, graphene oxide sheets may be modified before use. For example, graphene oxide may be washed, purified, filtered, dried, or combinations of the same before further use.

Preparing Transition Metal Nanoparticles/2D Material

Returning to FIG. 1A, a sample that includes a plurality of transition metal oxide nanoparticles (TMO NPs) and a plurality of ultrathin sheets of a first 2D material (i.e., a TMO NPs/first 2D material sample) is prepared in Step 130 of example method 100. The first 2D material can be a 2D carbon material (for example, graphene, graphene oxide, or reduced graphene oxide), a 2D nitride (for example, functionalized boron nitride or hexagonal boron nitride), a 2D metal chalcogenide (for example, $MoS_2$, $SnS_2$, $TiS_2$, $WS_2$, $MoSe_2$, or $WSe_2$), a 2D oxide (for example, $TiO_2$, $ZnO$, $MnO_2$, or a perovskite), or a 2D hybrid material (for example, $MoS_2$/graphene or $MoSe_2/MnO_2$). For example, the first 2D material may be graphene or reduced graphene oxide.

Figure 1C:
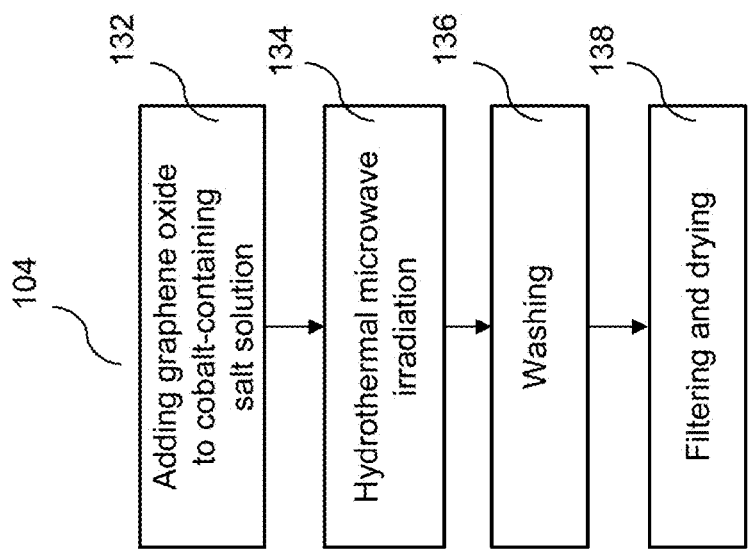
FIG. 1C is a block diagram showing a method for preparing a transition metal oxide/first 2D material sample, according to an illustrative embodiment.

FIG. 1C shows an illustrative example of method 104 for preparing a TMO NPs/first 2D material sample. In Step 132 of example method 104, graphene oxide (for example, prepared in Step 104 of method 100 shown in FIG. 1A or obtained otherwise) is added to a solution that includes a cobalt-containing salt. For example, the cobalt-containing salt may be cobalt (II) acetate tetrahydrate ($Co(C_2H_3O_2)_2$), cobalt nitrate, or cobalt chloride. The concentration of the cobalt-containing salt in the solution is in a range from 0.01 mol/L to 0.5 mol/L. The concentration of graphene oxide in the solution is in a range from 1 mg/mL to 3 mg/mL. For example, the concentration of graphene oxide in the solution may be 2 mg/mL.

In certain embodiments, the mixture obtained in Step 132 is stirred or mixed. The mixture is stirred for 5 min, 10 min, 30 min, 1 hour, 12 hours, or a similar interval of time. For example, the mixture may be stirred mechanically, agitated with a magnetic stir bar, or exposed to ultrasonic irradiation. For example, the method of stirring may be selected to correspond to the size of vessel used to prepare the $Co_3O_4$/RGO sample in Step 132.

Step 134 of example method 104 includes the hydrothermal microwave irradiation of the mixture from Step 132. In this step, the mixture is exposed to microwaves under a high pressure at a high temperature. For example, the mixture is heated (for example, in an autoclave) to a temperature of at least 140° C. For example, the mixture may be heated to a temperature in a range from 140° C. to 220° C. For example, the mixture may be heated to a temperature of 180° C. During Step 134, the mixture is held in a vessel (for example, an autoclave) at a pressure of at least 150 psi. For example, the mixture may be held in a vessel at a pressure in a range from 150 psi to 350 psi. In Step 134, the mixture is irradiated with microwaves at a power in a range from 900 W to 1800 W. For example, hydrothermal microwave irradiation may be performed for a reaction time in a range from 30 minutes to 60 minutes.

In Step 136, the mixture is washed. For example, solids in the mixture are separated from the liquids based on density (for example, by centrifugation and removal of the supernatant). The solids are then redispersed in a washing fluid to remove residual materials from the solid product. This process may be repeated multiple times. The washing fluid may include distilled water, another solvent (for example, an organic solvent), one or more salts, an acid (for example, dilute hydrochloric acid), or combinations of these.

After the solid material is washed in Step 136, it is separated from the washing fluid and dried to obtain a nanocomposite of the transition metal nanoparticles and the first 2D material in Step 138. The material may be filtered using centrifugation, filter paper, vacuum filtration, or combinations of these. The material is dried at room temperature or at a temperature of 30° C., 40° C., 50° C., or 60° C. to obtain a dry powder of the TMO NPs/2D material. For example, the product may be dried for 1 hour, 2 hours, 6 hours, 12 hours, 24 hours, or similar intervals of time.

Figure 6:
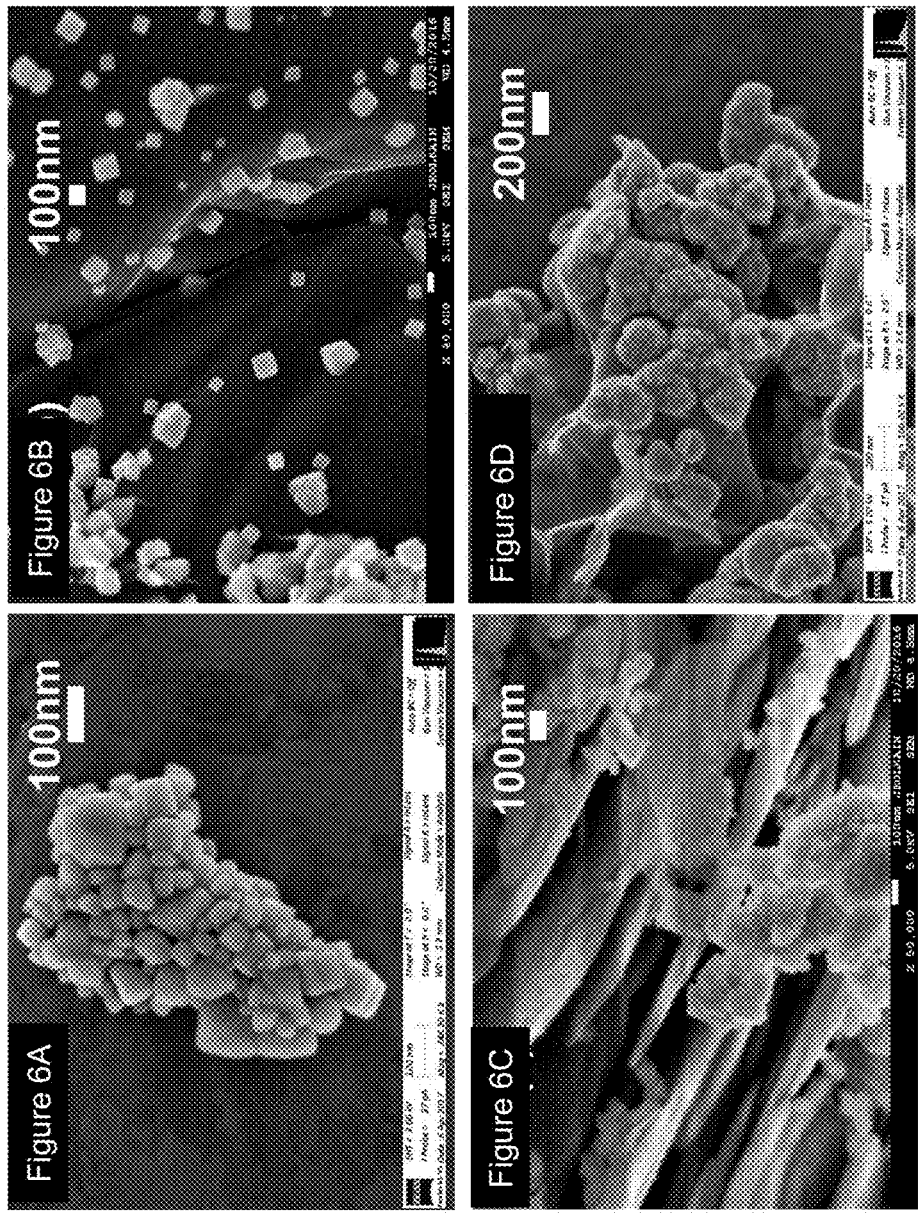
FIG. 6A is a scanning electron micrograph of example $Co_3O_4$ nanoparticles, according to an illustrative embodiment.
FIG. 6B is a scanning electron micrograph of an example $Co_3O_4$/RGO sample, according to an illustrative embodiment.
FIG. 6C is a scanning electron micrograph of an example $Co_3O_4$/h-BN sample, according to an illustrative embodiment.
FIG. 6D is a scanning electron micrograph of an example $Co_3O_4$/RGO/h-BN sample, according to an illustrative embodiment.

A scanning electron micrograph of example transition metal nanoparticles is shown in FIG. 6A. As shown in the micrograph, at least a portion of the plurality of transition metal nanoparticles have an average particle size of less than 300 nm. For example, at least a portion of the plurality of transition metal nanoparticles have an average particle size in a range from 30 nm to 45 nm and have a particle-size distribution with a standard deviation of 2 nm. Average particle size can be assessed, for example, using scanning electron microscopy. At least a portion of the plurality of transition metal nanoparticles may have an approximately rectangular prism shape like those shown in FIG. 6A.

At least a portion of the cobalt oxide has a cubic-spinel crystal structure. For example, a cubic-spinel crystal structure may be determined based on an intensity (or a relative intensity) of one or more peaks in an X-ray diffraction (XRD) pattern of the plurality of transition metal nanoparticles. For example, a cubic-spinel crystal structure may be determined based on an interplanar spacing measured with selected area electron diffraction (SAED) analysis.

The weight percent of the plurality of ultrathin sheets of the first 2D material may be in a range from 0.1% to 20%, where the weight percent is based on the total weight of the plurality of transition metal oxide nanoparticles, the plurality of ultrathin sheets of the first 2D material, and the plurality of ultrathin sheets of the second 2D material in the nanocomposite.

In certain embodiments, at least a portion of the plurality of ultrathin sheets of the first 2D material (for example, the reduced graphene oxide sheets) has an average sheet thickness of less than 20 nm. For example, at least a portion of the plurality of ultrathin sheets of the first 2D material (for example, the reduced graphene oxide sheets) may have an average sheet thickness in a range from 5 nm to 20 nm. For example, at least a portion of the plurality of ultrathin sheets of the first 2D material (for example, the reduced graphene oxide sheets) may have an average sheet thickness in a range from 5 nm to 10 nm. Average sheet thickness can be assessed, for example, using scanning electron microscopy.

Preparing Second 2D Material

Figure 1D:
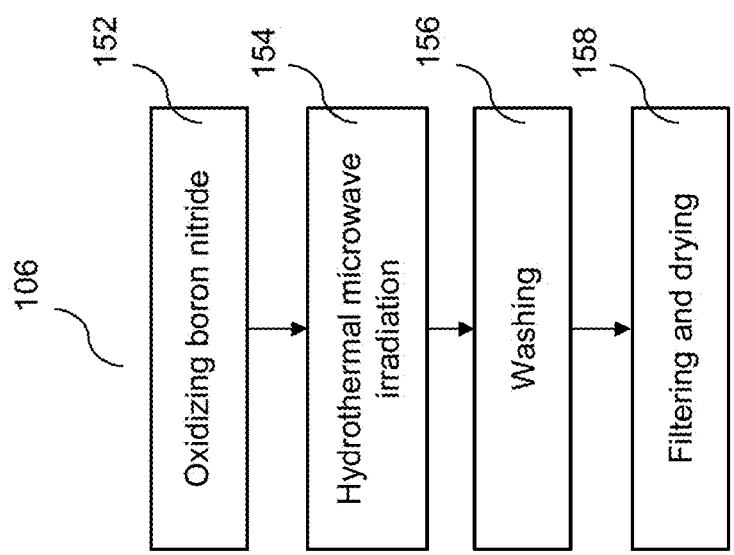
FIG. 1D is a block diagram showing a method for preparing a second 2D material, according to an illustrative embodiment.

Returning to FIG. 1A, a plurality of ultrathin sheets of a second 2D material are prepared in Step 150. As an illustrative example of this step, FIG. 1D shows example method 106 for preparing a plurality of functionalized boron nitride sheets.

In Step 152 of method 106, boron nitride is oxidized. Boron nitride may be oxidized in a mixture of hydrogen peroxide and sulfuric acid. The mixture of hydrogen peroxide and sulfuric acid may have a volumetric ratio of hydrogen peroxide to sulfuric acid ($H_2O_2$:$H_2SO_4$) in a range from 1:0.5 to 1:3. Boron nitride is added to this solution to achieve a concentration in a range from 0.5 mg/mL to 12 mg/mL.

Following Step 152, the mixture may be stirred or mixed. For example, the mixture may be stirred for 5 min, 10 min, 30 min, 1 hour, 12 hours, or a similar interval of time. For example, the mixture may be stirred mechanically, agitated with a magnetic stir bar, exposed to ultrasonic irradiation, or combinations of these. For example, the method of stirring may be selected to correspond to the size of vessel used to prepare the plurality of ultrathin sheets of the second 2D material in method 106.

Step 154 of example method 106 includes hydrothermal microwave irradiation of the mixture from Step 152. In Step 154, the mixture is exposed to microwaves under a high pressure at a high temperature. The mixture is heated (for example, in an autoclave) to a temperature of at least 140° C. For example, the mixture may be heated to a temperature in a range from 140° C. to 220° C. For example, the mixture may be heated to a temperature 180° C. During Step 154, the mixture is held in a vessel (for example, an autoclave) at a pressure of at least 150 psi. For example, the mixture may be held in a vessel at a pressure in a range from 150 psi to 350 psi. In Step 154, the mixture may be irradiated with microwaves at a power in a range from 900 W to 1800 W. Hydrothermal microwave irradiation in Step 154 may be performed for a reaction time in a range from 30 minutes to 60 minutes or more.

In Step 156, the mixture is washed. For example, solids in the mixture may be separated from the liquids based on density (for example, by centrifugation and removal of the supernatant). The solids may then be redispersed in a washing fluid to remove residual materials from the solid product. This process may be repeated multiple times. The washing fluid may include distilled water, another solvent (for example, an organic solvent), one or more salts, an acid (for example, dilute hydrochloric acid), or combinations of these.

After the solid material is washed in Step 156, it may be separated from the washing fluid and dried to obtain a functionalized boron nitride powder in Step 158. The material may be filtered using centrifugation, filter paper, vacuum filtration, or combinations of these. For example, the material may be dried at room temperature or at a temperature of 30° C., 40° C., 50° C., or 60° C. to obtain a dry powder of the ultrathin sheets of the 2D material. For example, the product may be dried for 1 hour, 2 hours, 6 hours, 12 hours, 24 hours, or similar intervals of time.

The second 2D material can be a 2D carbon material (for example, graphene, graphene oxide, or reduced graphene oxide), a 2D nitride (for example, functionalized boron nitride or hexagonal boron nitride), a 2D metal chalcogenide (for example, $MoS_2$, $SnS_2$, $TiS_2$, $WS_2$, $MoSe_2$, or $WSe_2$), a 2D oxide (for example, $TiO_2$, $ZnO$, $MnO_2$, or a perovskite), or a 2D hybrid material (for example, $MoS_2$/graphene or $MoSe_2$/$MnO_2$). For example, the second 2D material may be hexagonal boron nitride, boron nitride, or functionalized boron nitride (for example, functionalized via chemical oxidation (Step 152) and hydrothermal microwave irradiation (Step 154), as shown in FIG. 1D). The weight percent of the plurality of ultrathin sheets of the second 2D material in the nanocomposite is in a range from 0.1% to 50%, where the weight percent is based on the total weight of the plurality of transition metal oxide nanoparticles, the plurality of ultrathin sheets of the first 2D material, and the plurality of ultrathin sheets of the second 2D material in the nanocomposite.

At least a portion of the plurality of ultrathin sheets of the second 2D material (for example, the functionalized boron nitride sheets) has an average sheet thickness of less than 20 nm. For example, at least a portion of the plurality of ultrathin sheets of the second 2D material may have an average sheet thickness in a range from 5 to 20 nm. For example, at least a portion of the plurality of ultrathin sheets of the second 2D material may have an average sheet thickness in a range from 5 to 10 nm.

Without wishing to be bound to any particular theory, it is thought that the thermal, mechanical, and chemical properties of the second 2D material (for example, hexagonal boron nitride) may provide benefits to the nanocomposite and batteries described in the present disclosure. For example, the superior thermal stability of hexagonal boron nitride compared to that of common carbon materials may help to prevent thermal runaway events. For example, the mechanical properties of hexagonal boron nitride and reduced graphene oxide may allow the nanocomposite to better accommodate changes in the volume of the transition metal oxide nanoparticles during charging and discharging. When a first 2D material and second 2D material are combined, the chemical properties of the second 2D material (for example, hexagonal boron nitride) may improve the carrier mobility (for example, electron mobility) of the first 2D material (for example, reduced graphene oxide) via a substrate effect. For example, a nanocomposite that includes both a first 2D material and a second 2D material may have an increased carrier mobility (and thus improved electrochemical properties) compared to that of a nanocomposite the includes only the first 2D material or second 2D material alone.

It is thought, without wishing to be bound to any particular theory, that the use of two different 2D materials (for example, reduced graphene oxide and hexagonal boron nitride) in the nanocomposite may prevent restacking of the 2D materials when the nanocomposite is used as an anode material. For example, the nanocomposites described in the present disclosure may be less prone to restacking during charging and discharging, resulting in the retention of desirable physical and electrochemical properties. For example, the nanocomposite retains its large surface area and its superior specific capacity even after many (for example, 1,000 or more) charge/discharge cycles.

Mixing Materials and Drying

Returning to FIG. 1A, the TMO NPs/first 2D material sample from Step 130 and the second 2D material from Step 150 are contacted together (for example, added to a solvent and mixed) in Step 170 of method 100. For example, at least a portion of the transition metal oxide nanoparticles and at least a portion of the ultrathin sheets of the first 2D material prepared in Step 130 may be added to a volume of solvent along with at least a portion of the ultrathin sheets of the second 2D material prepared in Step 150. As an illustrative example of this step, FIG. 1E shows example method 108 for combining the materials prepared in Step 130 and Step 150 to form a nanocomposite.

Figure 1E:
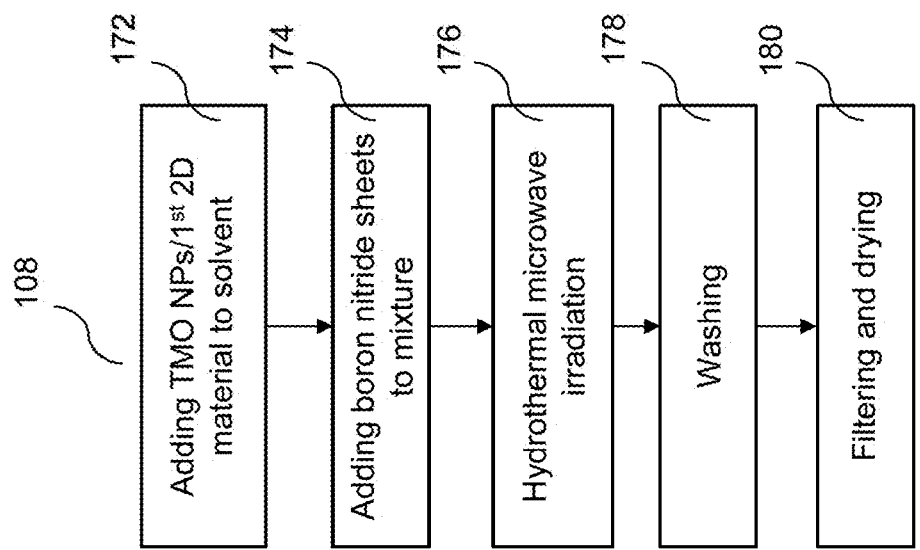
FIG. 1E is a block diagram showing a method for combining the transition metal oxide/first 2D material sample with the second 2D material, according to an illustrative embodiment.

As shown in FIG. 1E, the TMO NPs/first 2D material sample is dispersed in a solvent (Step 172). The solvent may be ethanol, distilled water, isopropyl alcohol, acetone, dimethylformamide, or combinations of these. The TMO NPs/first 2D material sample is added to the solvent at a concentration in a range from 1 mg/mL to 3 mg/mL. The mixture obtained in Step 172 may be stirred or mixed. For example, the mixture may be stirred for 5 min, 10 min, 30 min, 1 hour, 12 hours, or a similar interval of time. The mixture may be stirred mechanically, agitated with a magnetic stir bar, exposed to ultrasonic irradiation, or combinations of the same. The method of stirring may be selected to correspond to the size of vessel in which the TMO NPs/first 2D material are added to solvent in Step 172.

In Step 174, a plurality of sheets of the second 2D material (for example, from Step 150 of FIG. 1A) are added to the mixture prepared in Step 172. The second 2D material (for example, hexagonal boron nitride) may be dispersed in a fluid (for example, water, a salt solution, or a solvent), and this mixture may be added to the mixture from Step 172. Alternatively, a dry powder of the second 2D material may be added to the mixture from Step 172. The second 2D material is added to achieve a concentration of at least 1 mg/mL of the second 2D material in the mixture. For example, the concentration of the second 2D material in the mixture prepared in Step 174 may be in a range from 1 mg/mL to 3 mg/mL.

Step 176 of example method 108 includes the hydrothermal microwave irradiation of the mixture from Step 174. The mixture from Step 174 is exposed to microwaves under a high pressure at a high temperature. The mixture is heated (for example, in an autoclave) to a temperature of at least 140° C. For example, the mixture may be heated to a temperature in a range from 140° C. to 220° C. For example, the mixture may be heated to a temperature 180° C. The mixture is held in a vessel (for example, an autoclave) at a pressure of at least 150 psi. For example, the mixture may be held in a vessel at a pressure in a range from 150 psi to 350 psi. The mixture is irradiated with microwaves at a power in a range from 900 W to 1800 W. Hydrothermal microwave irradiation may be performed for a reaction time in a range from 30 minutes to 60 minutes or more.

In Step 178, the mixture is washed. Solids in the mixture are separated from the liquids based on density (for example, by centrifugation and removal of the supernatant). The solids are then dispersed in a washing fluid to remove residual materials from the solid product. This process may be repeated multiple times. The washing fluid may include distilled water, another solvent (for example, an organic solvent), one or more salts, an acid (for example, dilute hydrochloric acid), or combinations of these.

After the solid material is washed in Step 178, it may be separated from the washing fluid and dried to obtain a powder of the final nanocomposite in Step 180. The material may be filtered using centrifugation, filter paper, vacuum filtration, or combinations of these. For example, the material may be dried at room temperature or at a temperature of 30° C., 40° C., 50° C., or 60° C. to obtain a dry powder of the nanocomposite. For example, the product may be dried for 1 hour, 2 hours, 6 hours, 12 hours, 24 hours, or a similar interval of time.

Figures 2A, 2B:
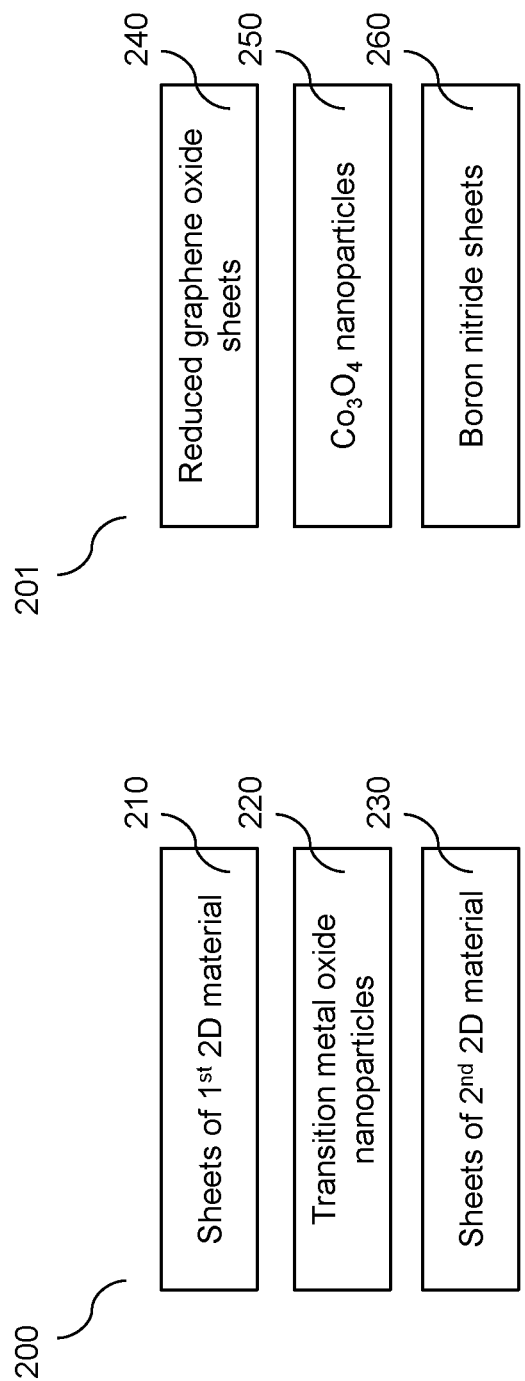
FIG. 2A is a block diagram showing a nanocomposite, according to an illustrative embodiment.
FIG. 2B is a block diagram showing a nanocomposite comprising a plurality of ultrathin reduced graphene oxide sheets, a plurality of cobalt oxide nanoparticles, and a plurality of ultrathin boron nitride sheets, according to an illustrative embodiment.

FIG. 2A is a block diagram showing a nanocomposite 200, according to an illustrative embodiment. For example, nanocomposite 200 includes a plurality of transition metal oxide nanoparticles 220, a plurality of ultrathin sheets of a first two-dimensional (2D) material 210, and a plurality of ultrathin sheets of a second two-dimensional (2D) material 230 where the second 2D material is of a different type than the first 2D material. An illustrative example of a nanocomposite 201 is shown in FIG. 2B. As shown in FIG. 2B, example nanocomposite 201 includes a plurality of reduced graphene oxide sheets 240, a plurality of transition metal oxide nanoparticles 250, and a plurality of hexagonal boron nitride sheets 260.

The nanocomposite (for example, the nanocomposite from Step 180 of FIG. 1E), may have a component weight ratio (x:y:z) in a range from (1:0.001:0.001) to (1:0.67:1.67), where x is the plurality of transition metal oxide nanoparticles, y is the plurality of ultrathin sheets of the first 2D material, and z is the plurality of ultrathin sheets of the second 2D material.

The nanocomposite (for example, obtained in Step 180 of FIG. 1E) may have a specific surface area in a range from 10 m$^2$/g to 500 m$^2$/g. For example, the nanocomposite may have a specific surface area in a range from 10 m$^2$/g to 200 m$^2$/g. For example, the specific surface area may correspond to a Brunauer-Emmett-Teller (BET) specific surface area which is measured via a nitrogen adsorption-desorption isotherm (for example, as shown in the illustrative example of FIG. 9D).

Lithium-Ion Batteries and Lithium-Sulfur Batteries

Figure 3A:
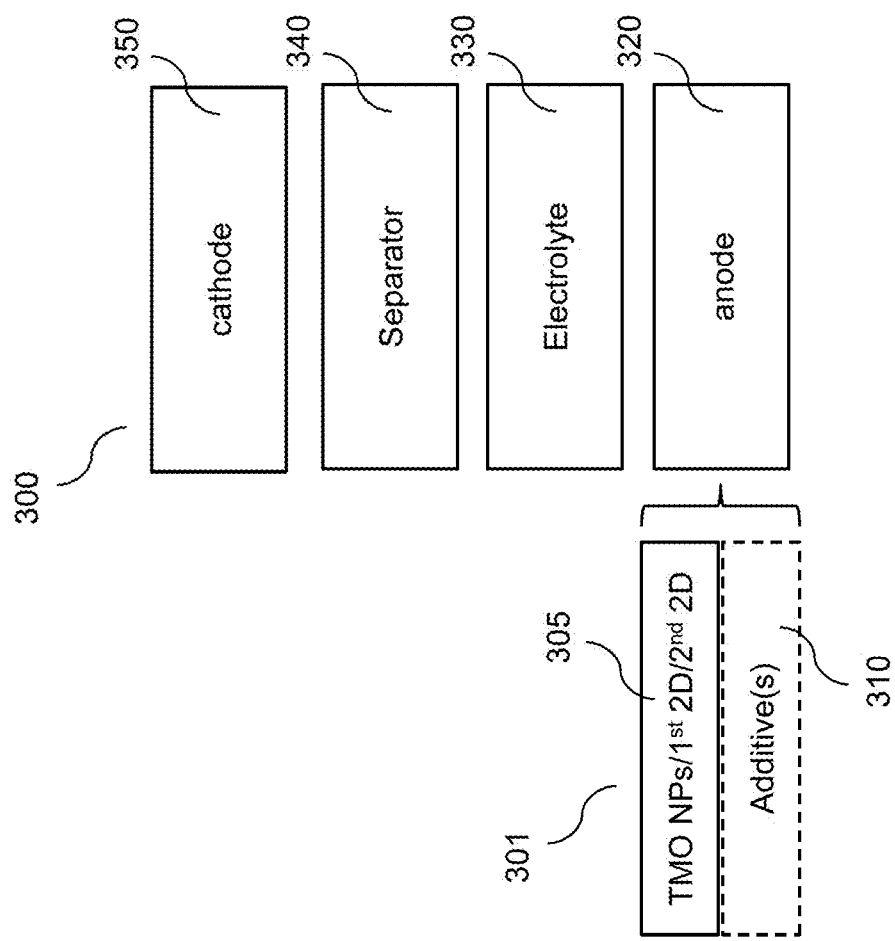
FIG. 3A is a block diagram showing a lithium-ion battery, according to an illustrative embodiment.

The nanocomposites described previously may be used as electrode materials in rechargeable batteries (for example, lithium-ion and lithium-sulfur batteries) designed to tolerate operation at high temperatures and high pressures. FIG. 3A is a block diagram of example lithium-ion battery 300 designed for this purpose. Lithium-ion battery 300 also includes an anode material 320, an electrolyte 330, a separator 340, and a cathode 350. The anode includes an anode material 301, which includes a TMO NPs/first 2D material/ second 2D material nanocomposite 305 (for example, obtained in Step 180 of FIG. 1E) and other additive(s) 310. For example additive(s) 310 may include a binding agent, a conductive additive, or both. For example, the binding agent may be polyvinylidene fluoride or styrene butadiene. The conductive additive may, for example, be carbon black or a carbon nanotube-based conductive material. The solvent may, for example, be N-methyl-2-pyrrolidone or tetrahydrofuran.

A summed weight percent of additive(s) 310 (for example, a binding agent and a conductive additive) in the nanocomposite is in a range from 5% to 20% where the weight percent is based on the total weight of (i) the plurality of transition metal oxide nanoparticles, (ii) the plurality of ultrathin sheets of the first 2D material, (iii) the plurality of ultrathin sheets of the second 2D material, and (iv) any additive(s) 310 present in the nanocomposite. For example, the amount of the binding agent in the nanocomposite may be zero, or the amount of conductive additive in the nanocomposite may be zero. Alternatively, the nanocomposite may contain both the binding agent and the conductive additive. A summed weight percent of the binding agent and the conductive additive in the nanocomposite may be about 10%.

For lithium-ion battery 300, cathode 350 may be, for example, a lithium metal or a lithium metal oxide. For lithium-ion battery 300, electrolyte 330 may be, for example, one or more lithium salts dissolved in one or more organic solvents. For example, the one or more lithium salts may include lithium hexafluorphosphate. The organic solvents may include, for example, ethylene carbonate or dimethyl carbonate. Separator 340 may be a polypropylene membrane that is placed between the anode and the cathode.

In certain embodiments, the lithium-ion battery may exhibit an improved electrochemical performance at both room temperature (for example, at about of 25° C.) and at high temperatures (for example, of 100° C. or greater). For example, the lithium-ion battery may have a specific capacity (for example, specific charge/discharge capacity) in range from 60 mAh/g to 800 mAh/g or greater at about 25° C. For example, the lithium-ion battery may have a specific capacity (for example, specific charge/discharge capacity) in range from 1 mAh/g to 5 mAh/g or greater at about 100° C.

A lithium-ion battery that includes the nanocomposite described in the present disclosure may retain beneficial electrochemical characteristics after multiple charge/discharge cycles at both room temperature (for example, at about of 25° C.) and high temperatures (for example, of 100° C. or greater). For example, after 100 charge/discharge cycles at about 25° C. or 100° C., the lithium-ion battery may retain at least 90% of its specific capacity compared to an initial specific capacity measured in the first charge cycle at the same temperature. For example, after 1,000 charge/discharge cycles at about 25° C. or 100° C., the lithium-ion battery may retain at least 90% of its specific capacity compared to an initial specific charge capacity measured in the first charge cycle at the same temperature. For example, after 100 charge/discharge cycles at about 25° C. or 100° C., the coulombic efficiency of the lithium-ion battery may be 90% or greater. For example, after 1,000 charge/discharge cycles at about 25° C. or 100° C., the coulombic efficiency of the lithium-ion battery may be 90% or greater.

Figure 3B:
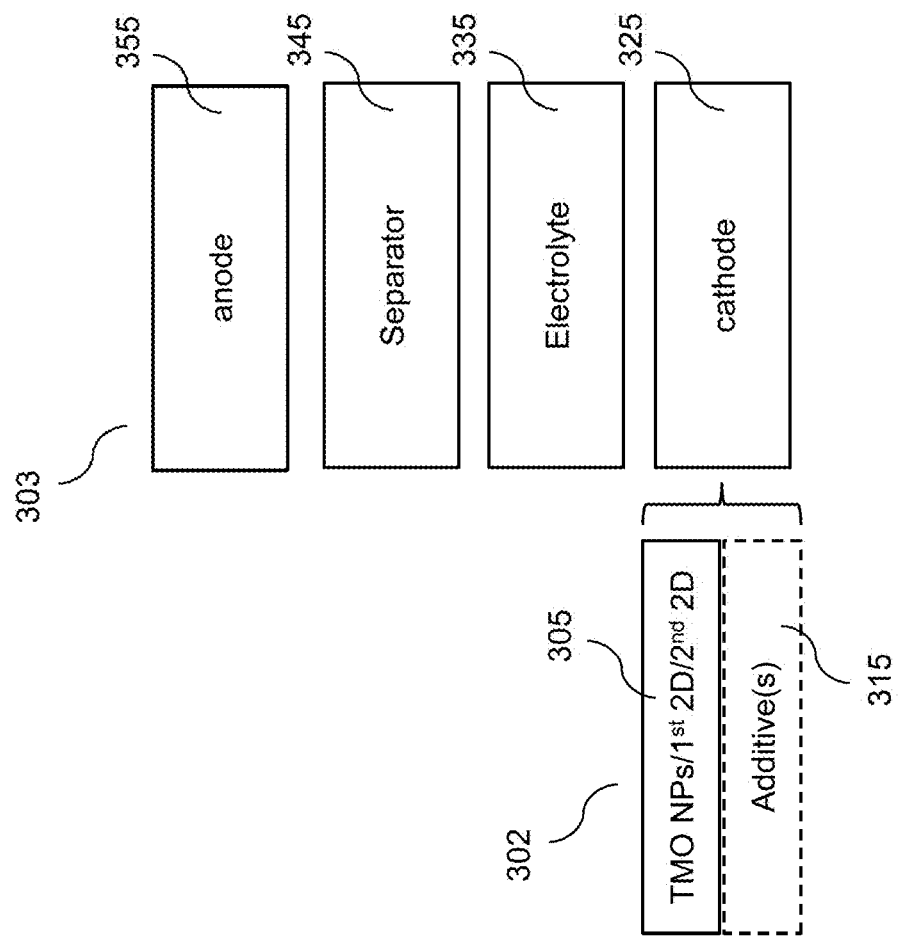
FIG. 3B is a block diagram showing a lithium-sulfur battery, according to an illustrative embodiment.

In certain embodiments, the nanocomposites described in the present disclosure can be used as a cathode material for lithium-sulfur batteries. FIG. 3B shows an illustrative example of a lithium-sulfur battery 303. Lithium-sulfur battery 303 includes cathode 325, electrolyte 335, separator 345, and anode 355. Cathode 325 includes a TMO NPs/first 2D material/second 2D material nanocomposite 305 (for example, obtained in Step 180 of FIG. 1E) and other additive(s) 315. To prepare a cathode material for lithium-sulfur batteries, the nanocomposite 302 may further include sulfur, for example, as one of additive(s) 315. Nanocomposite 302 may include sulfur in the form of elemental sulfur, a sulfur-containing salt, a sulfur- and lithium-containing salt, a sulfur/graphene composite, or combinations of the same.

For a nanocomposite that includes sulfur, the weight percent of sulfur in the nanocomposite is in a range from 40% to 80% where the weight percent is based on total weight of (i) the plurality of transition metal oxide nanoparticles, (ii) the plurality of ultrathin sheets of the first 2D material, (iii) the plurality of ultrathin sheets of the second 2D material, (iv) any binding agent, conductive additive, or both present in the nanocomposite, and (v) the sulfur. For example, a weight percent of sulfur in the nanocomposite may be in a range from 60% to 80%. For example, a weight percent of sulfur in the nanocomposite may be in a range from 70% to 80%.

For lithium-sulfur battery 303, anode 355 may be, for example, a lithium metal. For lithium-sulfur battery 303, electrolyte 335 may be, for example, one or more lithium salts dissolved in one or more organic solvents. For example, the lithium salts may include bis(trifluoromethane)sulfonimide lithium salt (LiTFSI). For example, the organic solvents may include 1,2-dimethoxyethane (DME) or 1,3-dioxolane (DOL). Separator 345 may be a polypropylene membrane that is placed between the anode and the cathode.

In certain embodiments, the nanocomposite is a film with a thickness in a range from 50 μm to 200 μm. For example, the nanocomposite may be a film with a thickness in a range from 10 μm to 20 μm. A film of the nanocomposite may be prepared on a current collector such as a copper foil. For example, a homogeneous slurry of the nanocomposite (for example, the plurality of transition metal oxide nanoparticles, the plurality of ultrathin sheets of the first 2D material, the plurality of ultrathin sheets of the second 2D material, any binding agent, conductive additive, or both present in the nanocomposite, and any sulfur present in the nanocomposite) in a solvent may be spread on a copper foil and allowed to dry.

EXPERIMENTAL EXAMPLES

Example 1: X-Ray Diffraction and Raman Spectroscopy of Nanocomposites

In order to confirm the synergistic properties of the components, the properties of example nanocomposite ($Co_3O_4$/RGO/h-BN—sample d) were compared to those of transition metal nanoparticles alone ($Co_3O_4$—sample a), a composite of transition metal oxide nanoparticles with a first 2D material ($Co_3O_4$/RGO—sample b), and a composite of transition metal nanoparticles with a second 2D material ($Co_3O_4$/h-BN—sample c). Table 1 shows a summary of the nanocomposites that were studied and their compositions.

TABLE 1

Summary of materials studied and their compositions (weight percent based on total weight of the material).

| Sample | $Co_3O_4$ | RGO | h-BN |
|---|---|---|---|
| (a) $Co_3O_4$ | 100% | — | — |
| (b) $Co_3O_4$/RGO | 85% | 15% | — |
| (c) $Co_3O_4$/h-BN | 85% | — | 15% |
| (d) $Co_3O_4$/RGO/h-BN | 57% | 10% | 33% |

XRD studies were performed on these samples with a Rigaku miniflex 600 X-ray diffractometer (Japan) using Cu Kα radiation (1.54430 angstrom (A)) at 30 kilovolts (kV) and 40 milliamps (mA). XRD studies were first performed to identify characteristic peaks for $Co_3O_4$, reduced graphene oxide (RGO), and hexagonal boron nitride (h-BN).

The diffraction peaks of $Co_3O_4$ were indexed to those of pure $Co_3O_4$ with a cubic spinel structure (Joint Committee on Powder Diffraction Standards (JCPDS) card no. 76-1802). Peaks related to the presence of $Co_3O_4$ are marked with an asterisk (*) in FIG. 4 (as shown in the legend to FIG. 4). The reduced graphene oxide (RGO) sheets exhibited a peak at about 2θ=23°, which was attributed to (002) RGO (as shown in the legend to FIG. 4). For the h-BN sheets, a peak was observed near 2θ=26°, which was attributed to (002) h-BN (as shown in the legend to FIG. 4).

Figure 4:
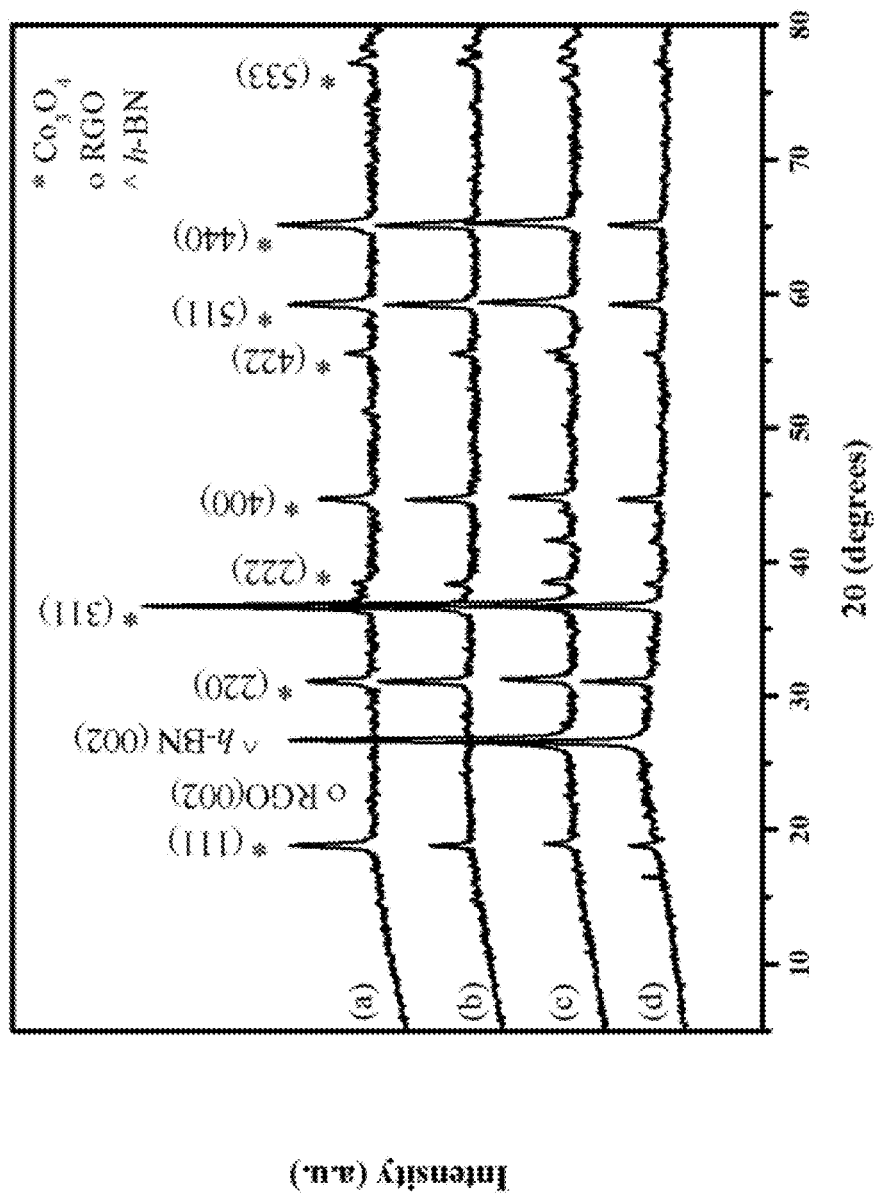
FIG. 4 is a plot of X-Ray diffraction (XRD) patterns for example $Co_3O_4$ nanoparticles (curve a), an example $Co_3O_4$/RGO sample (curve b), an example $Co_3O_4$/h-BN sample (curve c), and an example $Co_3O_4$/RGO/h-BN nanocomposite (curve d), according to an illustrative embodiment.

The XRD patterns for samples a, b, c, and d (see Table 1) are shown in FIG. 4. According to these results, each of the samples contained appropriate peaks for the components present in the corresponding sample. Both the $Co_3O_4$ nanoparticles (sample a) and the $Co_3O_4$/RGO nanocomposite (sample b) exhibited a broad diffraction peak near 2θ=23° which corresponds to the (002) indicates the presence of RGO as shown in FIG. 4.

Figure 5:
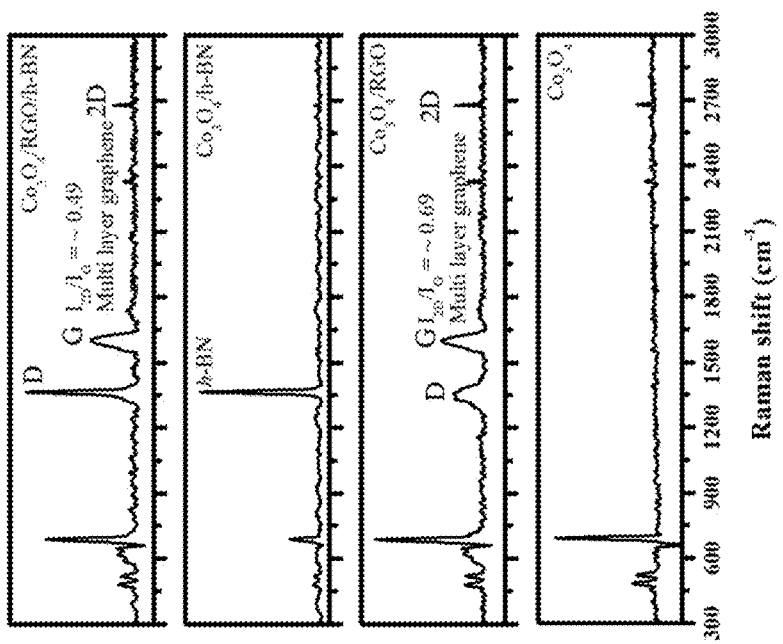
FIG. 5 is a plot of the Raman spectra of example $Co_3O_4$ nanoparticles, an example $Co_3O_4$/RGO sample, an example $Co_3O_4$/h-BN sample, and an example $Co_3O_4$/RGO/h-BN sample, according to an illustrative embodiment.

Raman spectroscopy was performed using an I-RAMAN® plus Raman spectrometer (USA) to determine the crystallographic structures of the different samples. The Raman spectra of samples a, b, c, and d are shown in FIG. 5. The Raman spectra of $Co_3O_4$ (sample a) included bands at about 478 $cm^{-1}$ ($E_g$), 521 $cm^{-1}$ ($F_{2g}$), 611 $cm^{-1}$ ($F_{2g}$), and 689 $cm^{-1}$ ($A_{1g}$), confirming the cubic spinel structure of $Co_3O_4$. The peak at 689 $cm^{-1}$ ($A_{1g}$) corresponded to octahedral sites in $Co_3O_4$, and the peaks at 478 $cm^{-1}$ ($E_g$), 521 $cm^{-1}$ ($F_{2g}$), and 611 $cm^{-1}$ ($F_{2g}$) were attributed to the combined vibrations of tetrahedral sites and octahedral oxygen motion in $Co_3O_4$.

The nanocomposites containing RGO (samples b and d) exhibited peaks at 1327 $cm^{-1}$ and 1584 $cm^{-1}$, which corresponded to the D band and G band of graphene, respectively. The D band may be associated with the breathing mode of k-point phonons with an $A_1g$ symmetry. The G band may be associated with an $E_gg$ phonon from $sp^2$ carbon atoms in the RGO. For the sample containing h-BN (sample c), a single peak was observed at 1365 $cm^{-1}$, corresponding to in-plane vibrations ($E_2g$).

Example 2: Microstructure of Nanocomposites

The microscale morphologies of samples a, b, c, and d were observed using scanning electron microscopy (JEOL SEM (USA) and ZEISS FESEM (Germany)). FIG. 6A is a scanning electron micrograph of example $Co_3O_4$ nanoparticles (sample a). As shown in FIG. 6A, the $Co_3O_4$ nanoparticles exhibited a rectangular prism shape.

FIG. 6B and FIG. 6C show scanning electron micrographs of an example $Co_3O_4$/RGO sample (sample b) and an example $Co_3O_4$/h-BN sample (sample c), respectively. As shown in FIG. 6B, the $Co_3O_4$/RGO nanocomposite contained rectangular prism-shaped $Co_3O_4$ nanoparticles on the surface of RGO sheets. These particles were nonporous and non-spherical. Similarly, as shown in FIG. 6C rectangular prism-shaped $Co_3O_4$ nanoparticles were observed on the surfaces of the h-BN sheets in the $Co_3O_4$/h-BN sample.

FIG. 6D shows a scanning electron micrograph of an example $Co_3O_4$/RGO/h-BN nanocomposite (sample d). The $Co_3O_4$/RGO/h-BN nanocomposite exhibited rectangular prism-shaped $Co_3O_4$ nanoparticles that were anchored between the transparent h-BN sheets and RGO sheets. Accordingly, the $Co_3O_4$ nanoparticles in the $Co_3O_4$/RGO/h-BN nanocomposite effectively prevented the sheets from restacking, providing space for the transport of electrolyte and ions in the final electrode materials and allowing the large surface area of the corresponding electrode to remain accessible to the electrolyte after multiple charge/discharge cycles.

Example 3: Thermal Properties

Figure 7:
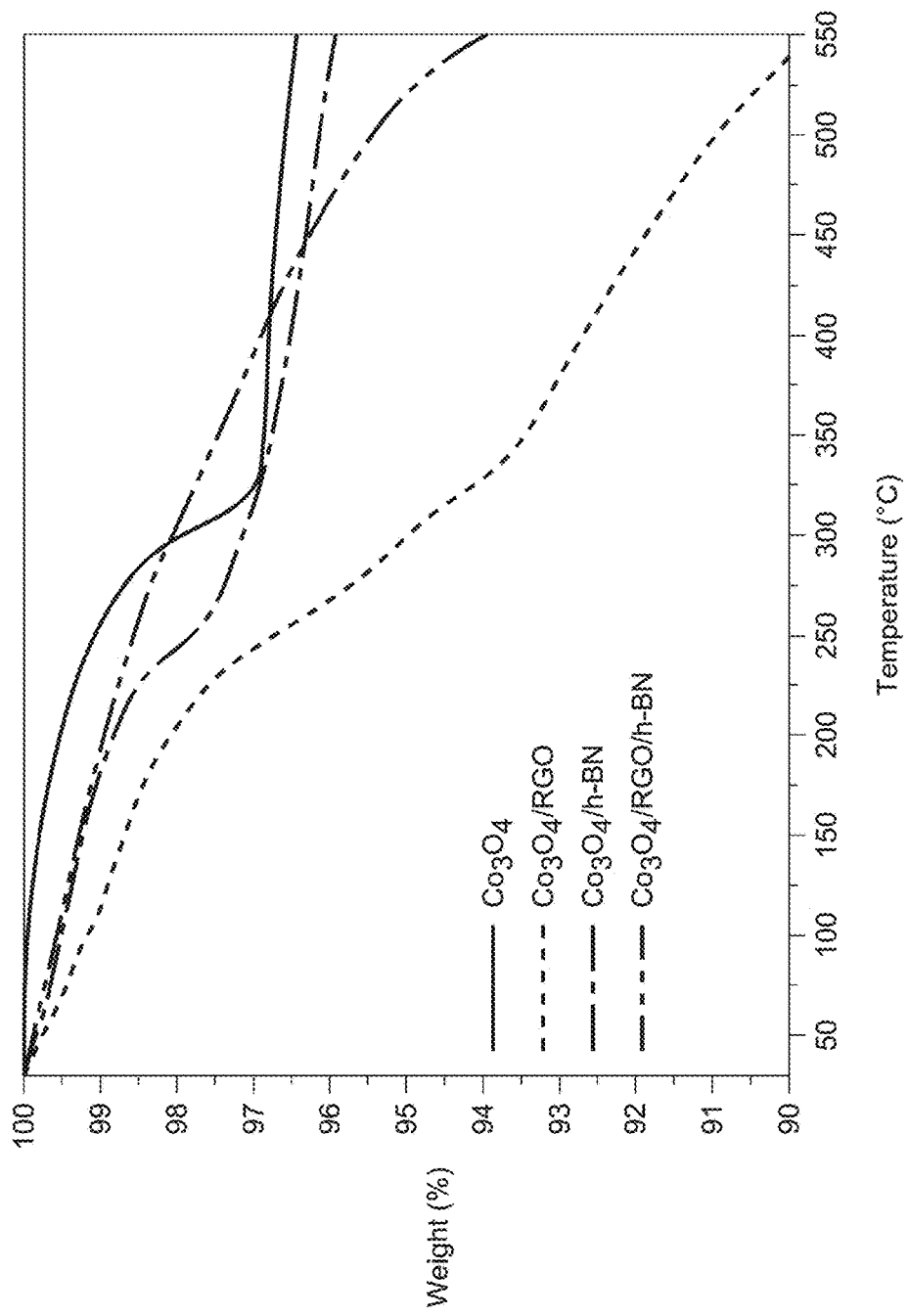
FIG. 7 is a plot of thermogravimetric analysis (TGA) curves for different example samples, according to an illustrative embodiment.

Thermogravimetric analysis (TGA) was performed to determine the thermal stability of samples a, b, c, and d at temperatures from 25° C. to 550° C. The resulting TGA curves—which are plots of weight (in percent of initial weight at the starting temperature) versus temperature—are shown in FIG. 7. Samples a, b, c, and d lost about 3.5%, 10%, 4%, and 5% of their initial weight, respectively, over the temperature range studied. The TGA curves can be divided into three temperature regions based on the extent of weight loss. In the first region (less than 100° C.), only 1% decomposition was observed for sample b ($Co_3O_4$/RGO). This weight loss was attributed to the removal of adsorbed water.

In the second temperature region (from 100° C. to 300° C.), sample c ($Co_3O_4$/h-BN) exhibited a weight loss of only about 2% at about 225° C. Meanwhile, sample b ($Co_3O_4$/RGO) exhibited a weight loss of about 4% at about 250° C. The weight losses for these samples in temperature region 2 were attributed to the decomposition of epoxy and hydroxyl groups in RGO and hydroxyl groups in h-BN. These results confirmed that the majority of oxygen-containing groups in the original graphene oxide were reduced to RGO during synthesis of the RGO sheets. Meanwhile, sample a ($Co_3O_4$) exhibited a weight loss of only about 3% at about 300° C., and sample d ($Co_3O_4$/RGO/h-BN) remained relatively stable at 550° C. with a total loss of 5%. No peaks were observed for the decomposition of sample d. These results indicated that the oxygen-containing groups introduced to the h-BN sheets during the functionalized process no longer remained at a high temperature.

Figure 8:
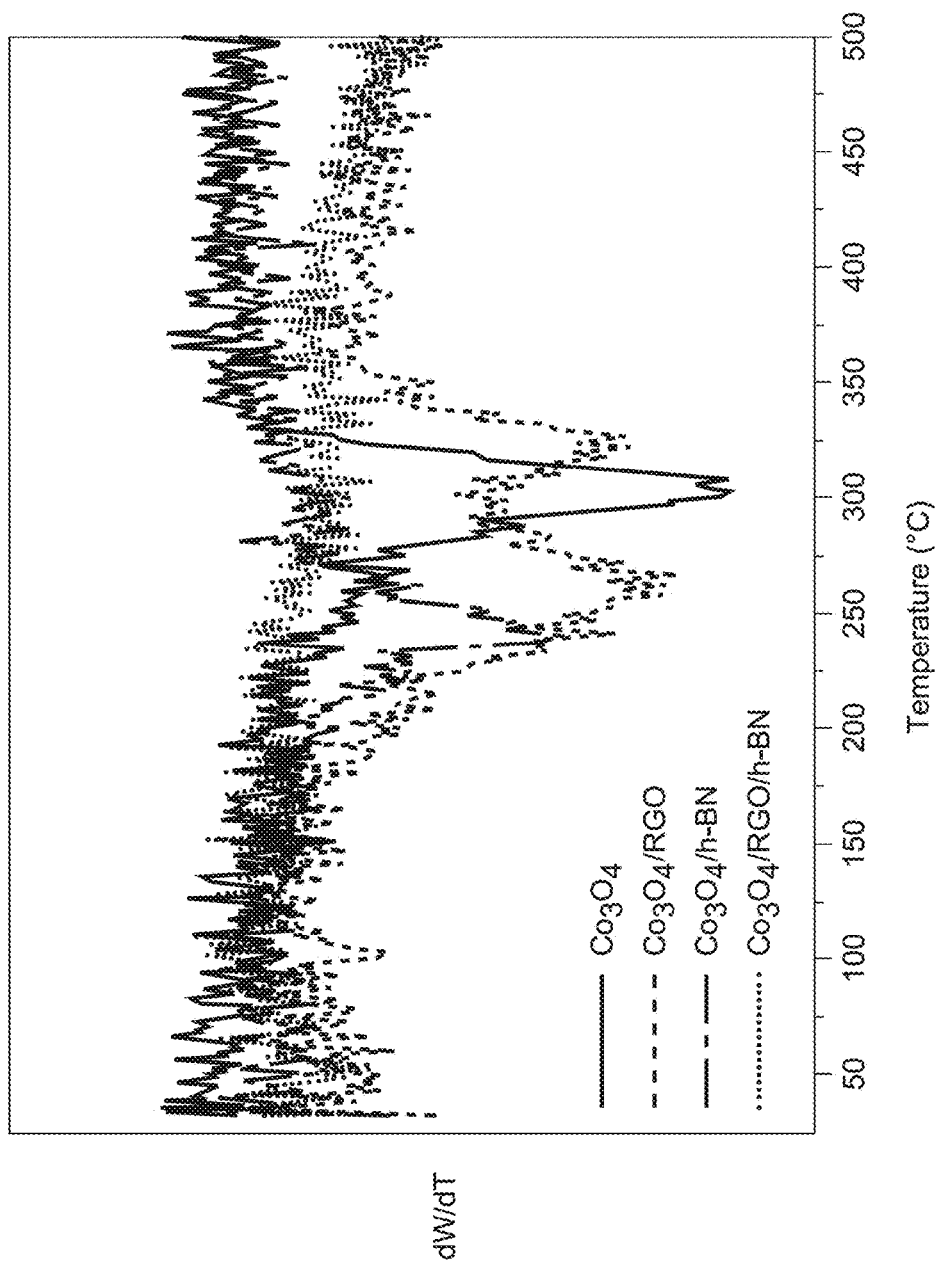
FIG. 8 is a first derivative plot (DTG curves) of the TGA curves shown in FIG. 7 for different example samples, according to an illustrative embodiment.

Derivative plots of the TGA curves (DTG curves) from FIG. 7 are shown in FIG. 8. These plots show the change in weight over the change in temperature (dW/dT) of samples a, b, c, and d versus temperature. As shown in FIG. 8, the degradation of sample a ($Co_3O_4$) began at about 300° C. For sample b ($Co_3O_4$/RGO), two degradation peaks were observed at about 250° C. and about 325° C. For sample c ($Co_3O_4$/h-BN), a single degradation peak was observed at an intermediate temperature of about 240° C. In contrast, sample d ($Co_3O_4$/RGO/h-BN) did not exhibit a sharp degradation peak. Instead, sample d only exhibited a low intensity peak beginning at about 350° C., indicating the superior thermal stability of the $Co_3O_4$/RGO/h-BN nanocomposite compared to those of the other samples (a, b, and c). The enhanced thermal stability of the $Co_3O_4$/RGO/h-BN nanocomposite compared to the other samples was attributed to the synergistic effects of RGO and h-BN.

Example 4: Surface Area of Nanocomposites

Specific surface areas of the samples were measured using the Brunauer-Emmett-Teller (BET) method. FIG. 9A shows a nitrogen adsorption-desorption isotherm for sample a ($Co_3O_4$). The BET specific surface area for the $Co_3O_4$ nanoparticles was about 41 m²/g. FIG. 9B shows a nitrogen adsorption-desorption isotherm for sample b ($Co_3O_4$/RGO). The BET specific surface area for the $Co_3O_4$/RGO sample was about 54 m²/g and was greater than that of the $Co_3O_4$ nanoparticles alone. FIG. 9C shows a nitrogen adsorption-desorption isotherm for sample c ($Co_3O_4$/h-BN). The BET specific surface area of the $Co_3O_4$/h-BN sample (12 m²/g) was less than that of all of the other samples. FIG. 9D shows a nitrogen adsorption-desorption isotherm for sample d ($Co_3O_4$/RGO/h-BN). The BET specific surface area for the $Co_3O_4$/RGO/h-BN nanocomposite (about 191 m²/g) was greater than those of the other samples. Accordingly, the $Co_3O_4$/RGO/h-BN nanocomposite had the largest available surface area per weight of material. This increased surface area can facilitate charge transfer in electrode materials, for example, for lithium ion batteries or lithium-sulfur batteries.

The BET specific surface areas of each of samples a, b, c, and d are also presented in Table 2 alongside their electrochemical properties for comparison.

TABLE 2

Specific charge/discharge capacities and BET surface areas of samples studied.

| Sample | Current density (mA/g) | Specific charge/ discharge capacity (mAh/g) | BET surface area (m²/g) |
|---|---|---|---|
| $Co_3O_4$ | 200 | 6/3 | 41 |
| $Co_3O_4$/RGO | 200 | 300/280 | 54 |
| $Co_3O_4$/h-BN | 200 | 19/5 | 12 |
| $Co_3O_4$/RGO/h-BN | 200 | 651/817 | 191 |

Example 5: Electrochemical Properties of Nanocomposites at Room Temperature

An anode material was prepared from each of samples a, b, c, and d. Batteries were assembled using these anode materials for electrochemical studies. In this experimental example, the working electrode was fabricated by mixing 90 weight percent (wt. %) of the sample (a, b, c, or d), 5 wt. % of the conductive agent carbon black, and 5 wt. % of the binding agent polyvinylidene fluoride in N-methyl-2-pyrrolidone solvent at a concentration of 100 mg/10 mL. A homogenous slurry of this mixture was obtained and spread as a film on a copper foil substrate, which acted as a current collector. This film was then allowed to dry at 60° C. under vacuum. Each working electrode contained about 1 mg of the corresponding sample (a, b, c, or d). The working electrode was then punched into disks, each with a diameter of about 14 millimeters (mm).

A polypropylene membrane (Celgard 2325, Celgard, Inc., USA) was used as a separator in the battery along with a lithium metal (purity 99.9%) counter electrode. The electrolyte was 1 mol/L lithium hexafluorophosphate ($LiPF_6$) in a 1:1 by volume mixture of ethylene carbonate (EC) and dimethyl carbonate (DMC).

Figure 10A:
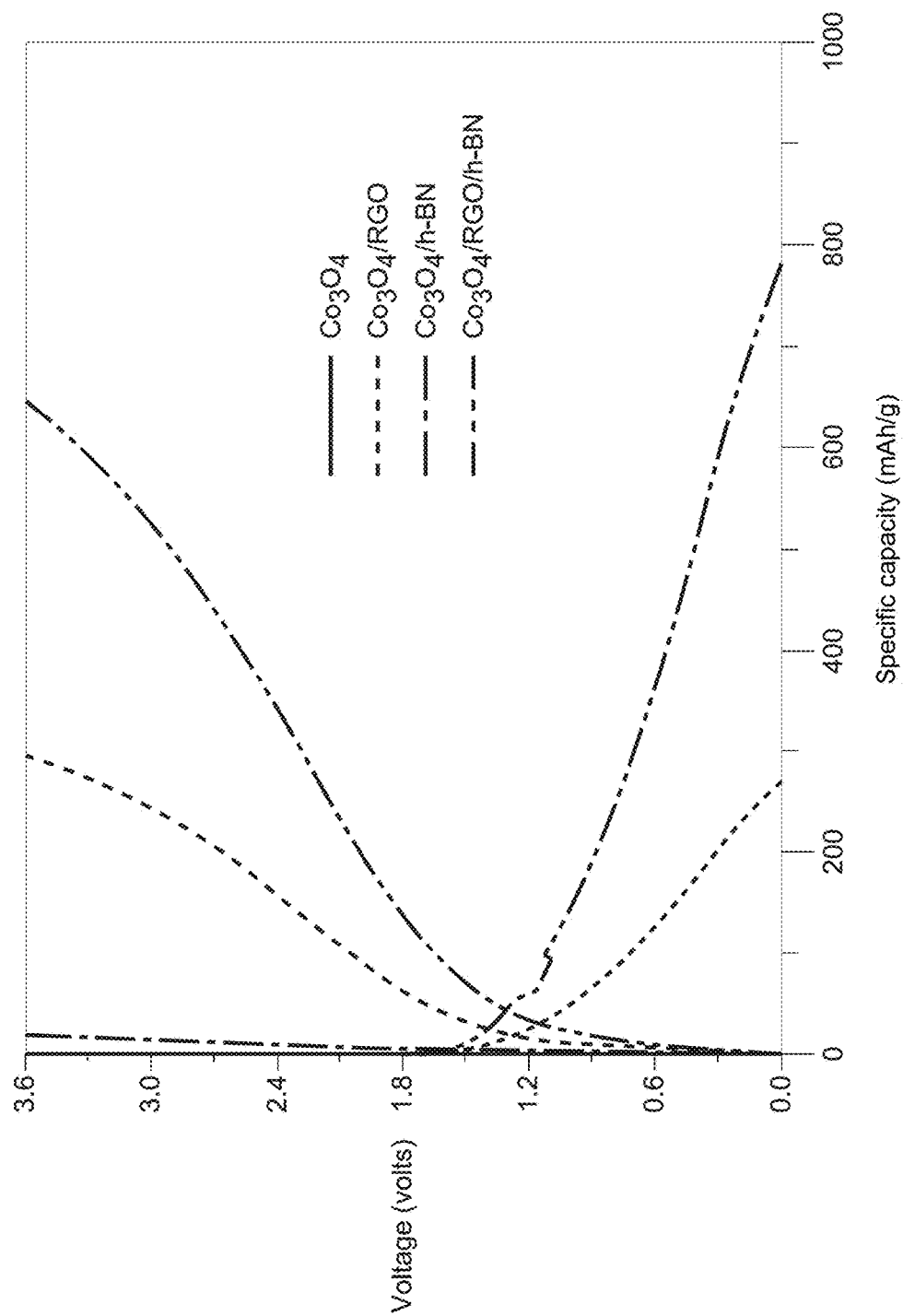
FIG. 10A is a plot of curves of voltage versus specific capacity for lithium-ion batteries prepared with different anode materials, according to an illustrative embodiment.

The electrochemical performances of the assembled coin cell lithium-ion batteries were tested at both room temperature (at about 25° C.) and at a high temperature (at about 100° C.). Galvanostatic charge/discharge measurements were performed using the assembled batteries at a current density of 200 mA/g for a single cycle. FIG. 10A shows the results of these measurements as plots of voltage versus specific capacity for lithium-ion batteries that included samples a, b, c, and d as anode materials. A battery that included the $Co_3O_4$/RGO/h-BN nanocomposite (sample d) exhibited increased charge and discharge capacities of 651 mAh/g and 817 mAh/g, respectively. A battery that included $Co_3O_4$/RGO (sample b) had the second largest charge and discharge capacities of 300 mAh/g and 280 mAh/g, respectively. Meanwhile, the charge and discharge capacities of a battery with $Co_3O_4$/h-BN (sample c) were only 19 mAh/g and 5 mAh/g, respectively, and a battery with a $Co_3O_4$ anode material had the lowest charge and discharge capacities of only 6 mAh/g and 4 mAh/g, respectively. These electrochemical properties are reported in Table 2.

Figure 10B:
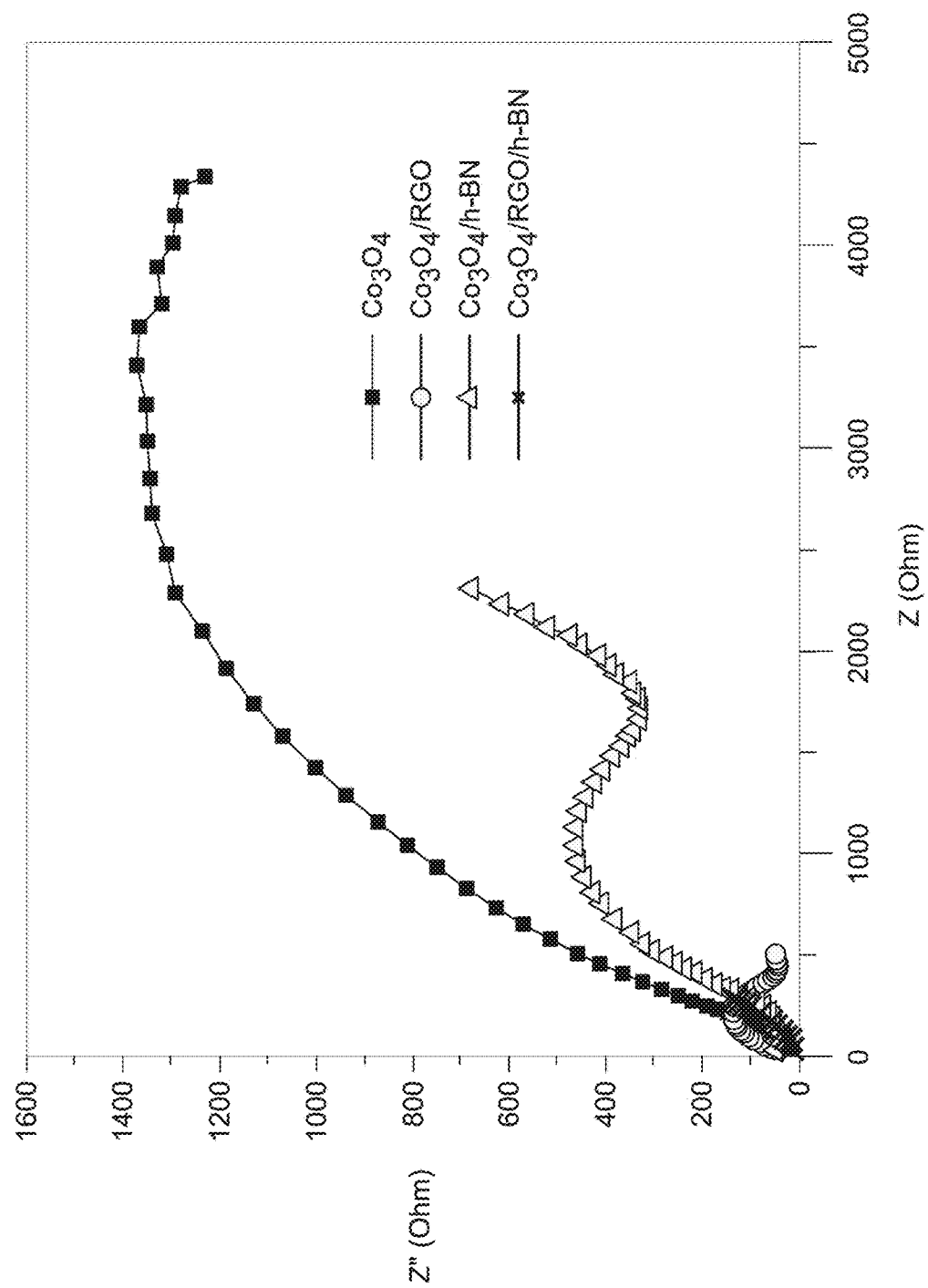
FIG. 10B is a Nyquist plot of the imaginary impedance (Z") versus the real impedance (Z) for lithium-ion batteries prepared with different anode materials, according to an illustrative embodiment.

FIG. 10B is a Nyquist plot of the imaginary impedance (Z") versus the real impedance (Z) for lithium-ion batteries that included samples a, b, c, and d as anode materials. The plots in FIG. 10B correspond to the first charging cycle for these batteries. In each plot, a depressed semicircle was observed in the high-frequency region (for example, at smaller values of Z on the x axis) which was attributed to the resistance of the solid electrolyte interphase (SEI) layer ($R_{SEI}$). In the medium frequency region (for example, at intermediate values of Z on the x axis), a broad arc was observed which was attributed to the charge-transfer resistance ($R_{ct}$) of $Li^+$ at the electrode/electrolyte interface. In the low frequency region (for example, at larger values of Z on the x axis), an inclined line was observed which was attributed to Warburg resistance ($R_W$). According to the results shown in FIG. 10B, the battery with an anode material that included the $Co_3O_4$/RGO/h-BN nanocomposite had the lowest resistance.

Example 6: Electrochemical Properties of Nanocomposites at 100° C.

The cycling performance of coin cell lithium-ion batteries with anodes that included the $Co_3O_4$/RGO/h-BN nanocomposite were tested at both room temperature (at about 25° C.) and at a high temperature of about 100° C.

Figure 11:
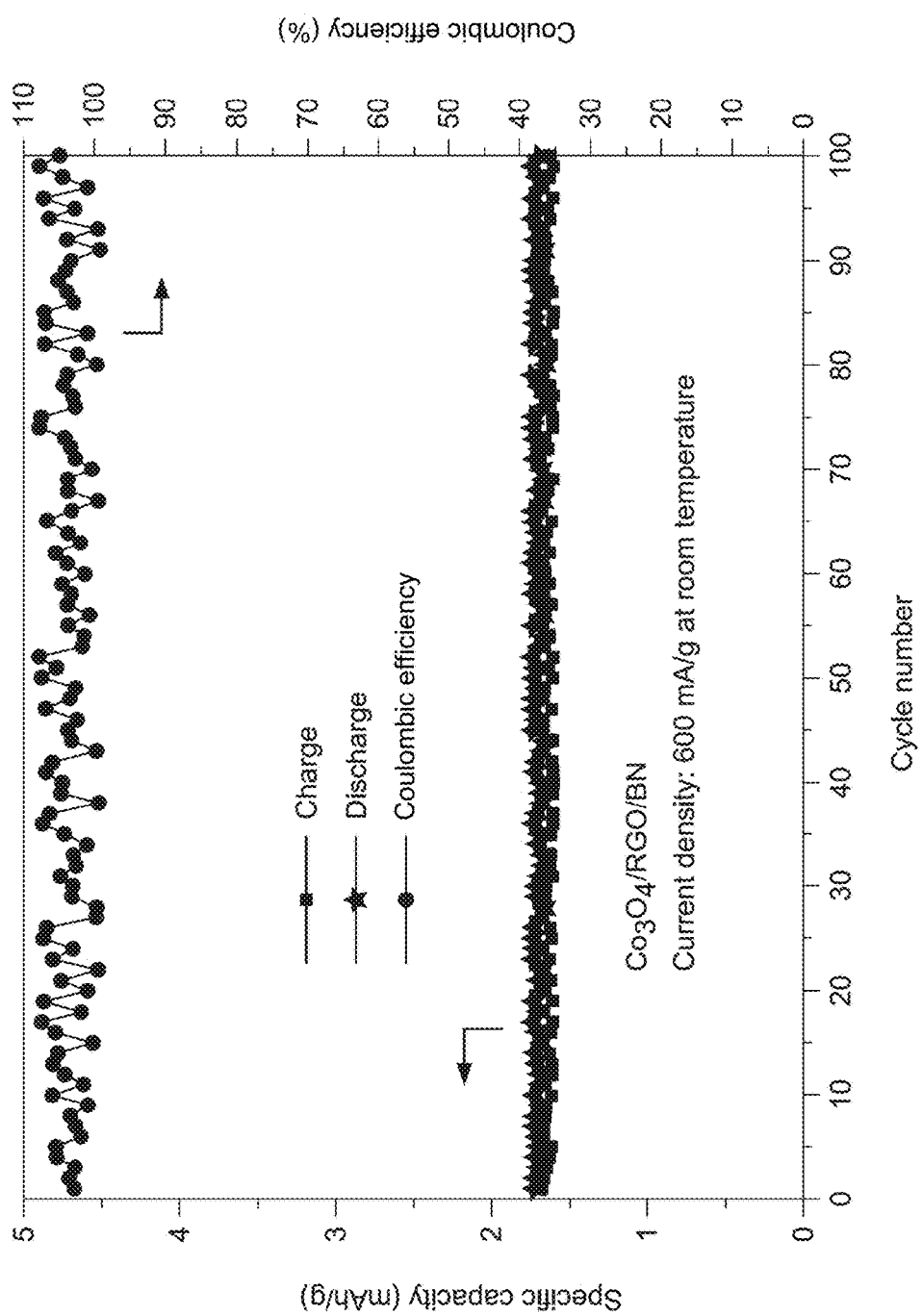
FIG. 11 is a plot of the specific capacity versus charge/discharge cycle number for an example battery with an anode that includes a $Co_3O_4$/RGO/h-BN nanocomposite for 100 charge/discharge cycles at room temperature (about 25° C.), according to an illustrative embodiment.

FIG. 11 is a plot of the specific capacity versus charge/discharge cycle number for the battery with an anode that includes the $Co_3O_4$/RGO/h-BN nanocomposite (sample d) for 100 cycles at about 25° C. The batteries exhibited stable cycle performances and approximately 100% coulombic efficiencies at 25° C.

Figure 12:
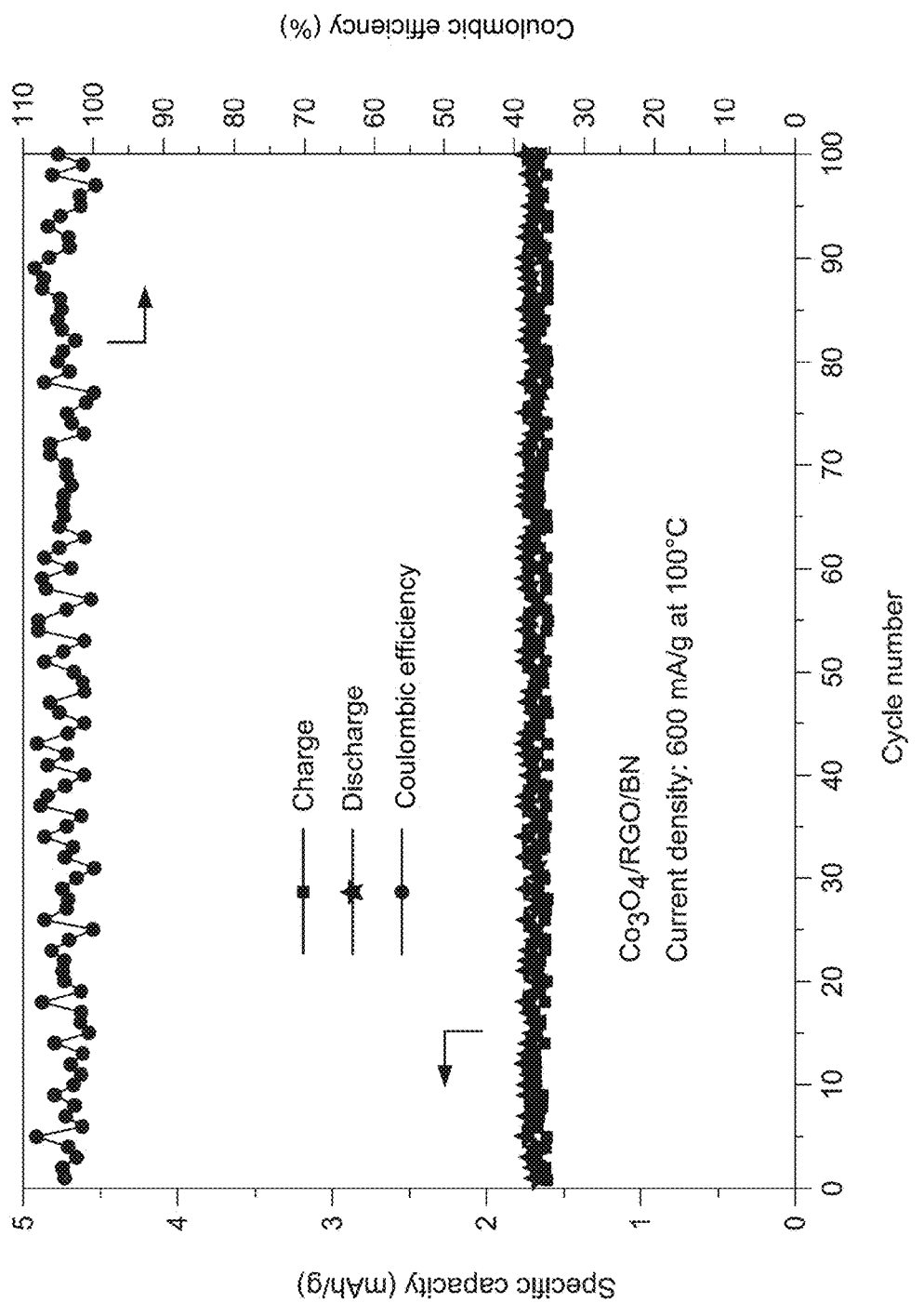
FIG. 12 is a plot of the specific capacity versus charge/discharge cycle number for an example battery with an anode that includes a $Co_3O_4$/RGO/h-BN nanocomposite for 100 charge/discharge cycles at about 100° C., according to an illustrative embodiment.
Figure 13:
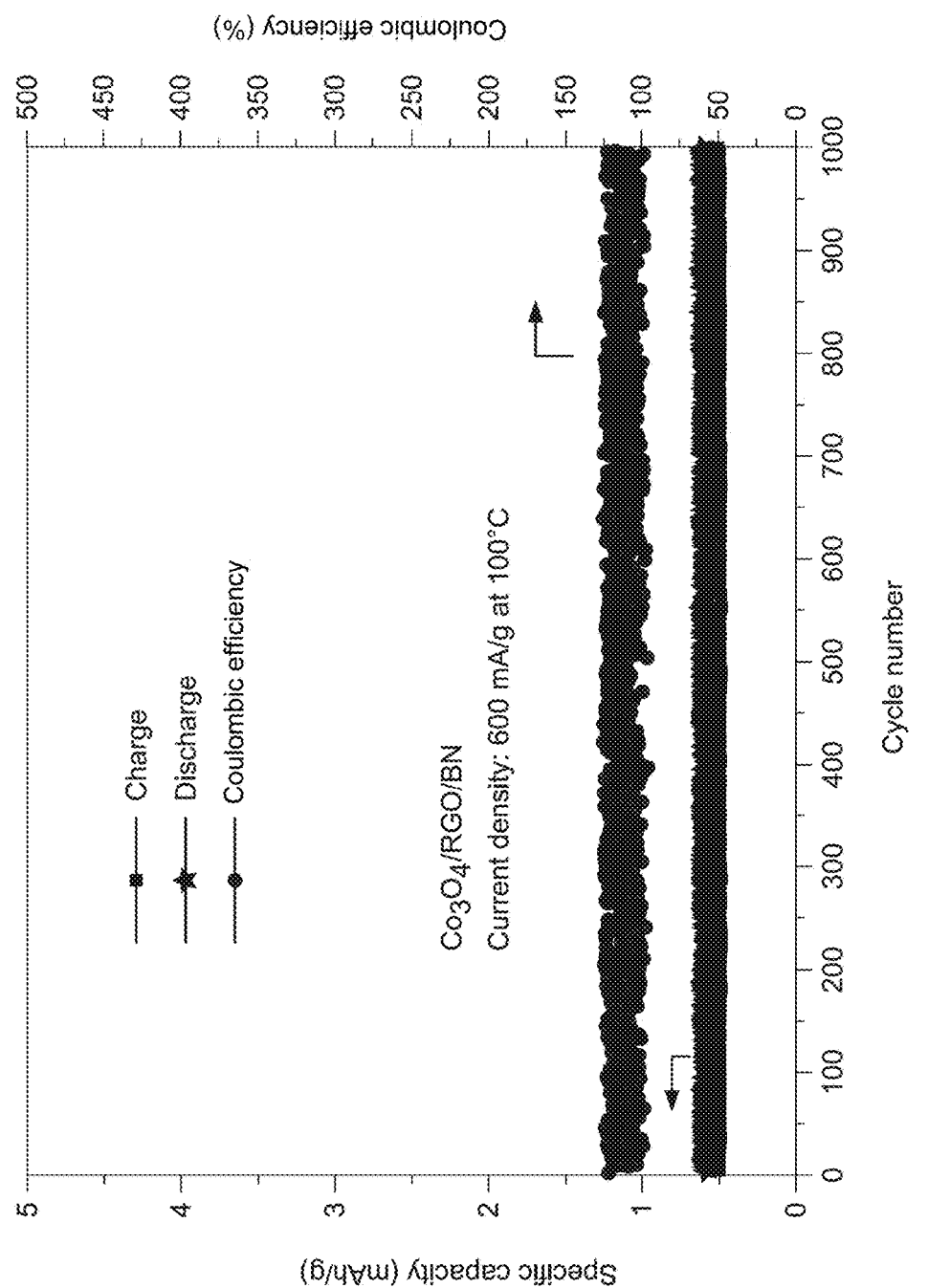
FIG. 13 is a plot of the specific capacity versus charge/discharge cycle number for an example battery with an anode that includes a $Co_3O_4$/RGO/h-BN nanocomposite for 1,000 charge/discharge cycles at about 100° C., according to an illustrative embodiment.

FIG. 12 and FIG. 13 are plots of the specific capacity versus charge/discharge cycle number for batteries with an anode that includes a $Co_3O_4$/RGO/h-BN nanocomposite (sample d) for 100 and 1,000 charge/discharge cycles, respectively, at about 100° C. The batteries exhibited stable cycle performances and approximately 100% coulombic efficiencies at 100° C. These results were in agreement with the improved thermal stability of sample d as determined from the TGA plots and DTG plots shown in FIG. 7 and FIG. 8, respectively.

Accordingly, the results shown in FIG. 11, FIG. 12, and FIG. 13 confirm that the $Co_3O_4$/RGO/h-BN nanocomposite is a stable anode material for use at both room temperature (at about 25° C.) and at high temperatures (about 100° C.).

Elements of different implementations described in the present disclosure may be combined to form other implementations not specifically set forth previously. Elements may be left out of the processes described in the present disclosure without adversely affecting their operation. In addition, the logic flows depicted in the figures do not necessarily require the particular order shown, or sequential order, to achieve desirable results. Various separate elements may be combined into one or more individual elements to perform the functions described in the present disclosure.

Throughout the description, where nanocomposites, materials, and systems are described as having, including, or comprising specific components, or where processes and methods are described as having, including, or comprising specific steps, it is contemplated that, additionally, there are apparatus, and systems of the present disclosure that consist essentially of, or consist of, the recited components, and that there are processes and methods according to the present disclosure that consist essentially of, or consist of, the recited processing steps.

It should be understood that the order of steps or order for performing certain action is immaterial so long as the approach described in the present disclosure remains operable. Moreover, two or more steps or actions may be conducted simultaneously.

While the approach described in the present disclosure has been particularly shown and described with reference to specific preferred embodiments, it should be understood by those skilled in the art that various changes in form and detail may be made therein without departing from the spirit and scope of the disclosure as defined by the appended claims.

What is claimed is:

1. A method of preparing a nanocomposite, the method comprising:
    preparing a plurality of transition metal oxide nanoparticles and a plurality of ultrathin reduced graphene oxide sheets by applying microwave irradiation to a volume of a first solvent comprising a transition metal-containing salt and graphene oxide;
    preparing a plurality of ultrathin boron nitride sheets by (i) oxidizing boron nitride in a volume of a second solvent and (ii) applying microwave irradiation to the volume of the second solvent;
    contacting together (i) at least a portion of the plurality of transition metal oxide nanoparticles, (ii) at least a portion of the plurality of ultrathin reduced graphene oxide sheets, and (iii) at least a portion of the plurality of ultrathin boron nitride sheets in a volume of a third solvent, thereby preparing a nanocomposite mixture; and
    drying the nanocomposite mixture, thereby preparing a nanocomposite.

2. The method of claim 1, comprising, following drying the nanocomposite mixture, contacting together the nanocomposite mixture with sulfur.

3. The method of claim 1, wherein the microwave irradiation applied to the volume of the first solvent is at a temperature of at least about 140° C.

4. The method of claim 3, wherein the microwave irradiation applied to the volume of the first solvent is at a temperature in the range of about 140° C. to about 220° C.

5. The method of claim 1, wherein the microwave irradiation applied to the volume of the first solvent is at a power of at least about 900 W.

6. The method of claim 5, wherein the power of the microwave irradiation applied to the volume of the first solvent is in the range of about 900 W to about 1800 W.

7. The method of claim 1, wherein the plurality of transition metal oxide nanoparticles and the plurality of ultrathin reduced graphene oxide sheets are prepared at a pressure of at least about 150 psi.

8. The method of claim 7, wherein the plurality of transition metal oxide nanoparticles and the plurality of ultrathin reduced graphene oxide sheets are prepared at a pressure in the range of about 150 psi to about 350 psi.

9. The method of claim 1, wherein the transition metal-containing salt is a cobalt-containing salt.

10. The method of claim 9, wherein the cobalt-containing salt is selected from a group consisting of cobalt (II) acetate tetrahydrate, cobalt nitrate, or cobalt chloride.

11. The method of claim 1, wherein the second solvent is a mixture of $H_2O_2$ and $H_2SO_4$.

12. The method of claim 1, wherein the microwave irradiation applied to the volume of the second solvent is at a temperature in the range of about 120° C. to about 180° C.

13. The method of claim 1, wherein the microwave irradiation applied to the volume of the second solvent is at a power of about 900 W.

14. The method of claim 1, wherein the plurality of ultrathin boron nitride sheets are prepared at a pressure of about 150 psi.

15. The method of claim 2, wherein the sulfur is in a form selected from a group consisting of elemental sulfur, a sulfur-containing salt, or a sulfur/graphene composite.

16. The method of claim 15, wherein the sulfur-containing salt further comprises lithium.

17. The method of claim 2, wherein sulfur is present at a weight percent in a range of about 50% to about 80%, wherein the weight percent is based on total weight of the nanocomposite.

18. The method of claim 17, wherein the weight percent of sulfur is about 60% to 80%.

19. The method of claim 17, wherein the weight percent of sulfur is about 70% to 80%.

20. The method of claim 1, wherein the nanocomposite mixture is dried for about 12 hours at 60° C.

* * * * *